(12) United States Patent
Sugino

(10) Patent No.: US 10,190,295 B2
(45) Date of Patent: Jan. 29, 2019

(54) FAUCET

(71) Applicant: Panasonic Intellectual Property Management Co., Ltd., Osaka (JP)

(72) Inventor: Satoshi Sugino, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 192 days.

(21) Appl. No.: 15/104,640

(22) PCT Filed: Dec. 2, 2014

(86) PCT No.: PCT/JP2014/006018
§ 371 (c)(1),
(2) Date: Jun. 15, 2016

(87) PCT Pub. No.: WO2015/092993
PCT Pub. Date: Jun. 25, 2015

(65) Prior Publication Data
US 2016/0312450 A1   Oct. 27, 2016

(30) Foreign Application Priority Data
Dec. 16, 2013  (JP) .................. 2013-259651

(51) Int. Cl.
*E03C 1/05* (2006.01)
*G01S 7/35* (2006.01)
(Continued)

(52) U.S. Cl.
CPC .............. *E03C 1/057* (2013.01); *G01S 7/354* (2013.01); *G01S 7/415* (2013.01); *G01S 13/56* (2013.01)

(58) Field of Classification Search
CPC combination set(s) only.
See application file for complete search history.

(56) References Cited

U.S. PATENT DOCUMENTS

| 2009/0031493 A1* | 2/2009 | Tsujita | .................. E03C 1/057 4/623 |
| 2011/0000559 A1* | 1/2011 | Murata | .................. E03C 1/057 137/551 |

FOREIGN PATENT DOCUMENTS

| JP | 2006-53069 A | 2/2006 |
| JP | 2012-211447 A | 11/2012 |

(Continued)

OTHER PUBLICATIONS

International Search Report for corresponding International Application No. PCT/JP2014/006018 dated Mar. 3, 2015.
(Continued)

*Primary Examiner* — Marina Tietjen
*Assistant Examiner* — Frederick D Soski
(74) *Attorney, Agent, or Firm* — Renner, Otto, Boisselle & Sklar, LLP

(57) ABSTRACT

The faucet includes a detector including: a frequency analyzer to convert a sensor signal into a frequency domain signal, and extract, by use of a group of individual filter banks with different frequency bands, signals of the individual filter banks from the frequency domain signal; a recognizer; and a database device, for storing sample data. The recognizer performs a recognition process of detecting a detection object based on detection data containing a frequency distribution of signals based on the signals of the individual filter banks. The recognizer performs the recognition process based on comparison between the detection data and the sample data.

6 Claims, 24 Drawing Sheets

(51) Int. Cl.
*G01S 7/41* (2006.01)
*G01S 13/56* (2006.01)

(56) References Cited

FOREIGN PATENT DOCUMENTS

| | | |
|---|---|---|
| JP | 2012-211838 A | 11/2012 |
| JP | 5212908 B2 | 3/2013 |
| JP | 2013-204323 A | 10/2013 |

OTHER PUBLICATIONS

Form PCT/ISA/237 for corresponding International Application No. PCT/JP2014/006018 dated Mar. 3, 2015.

* cited by examiner

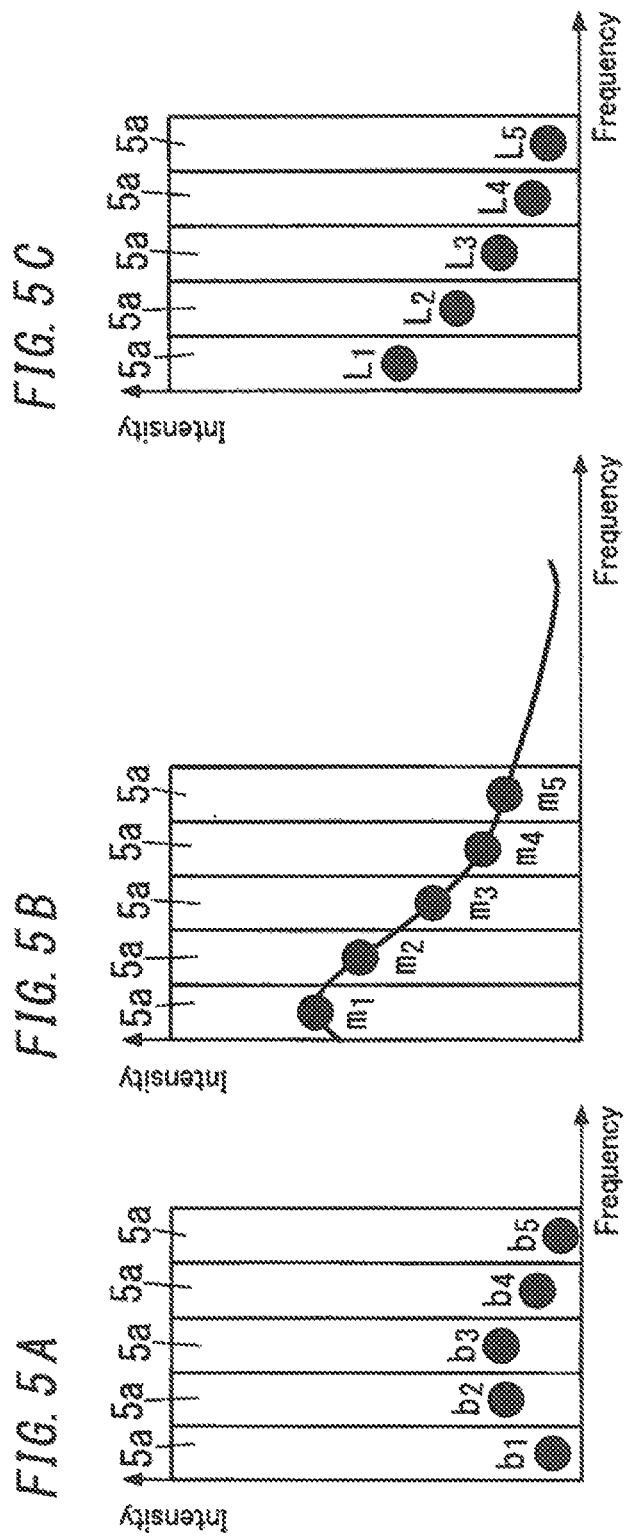

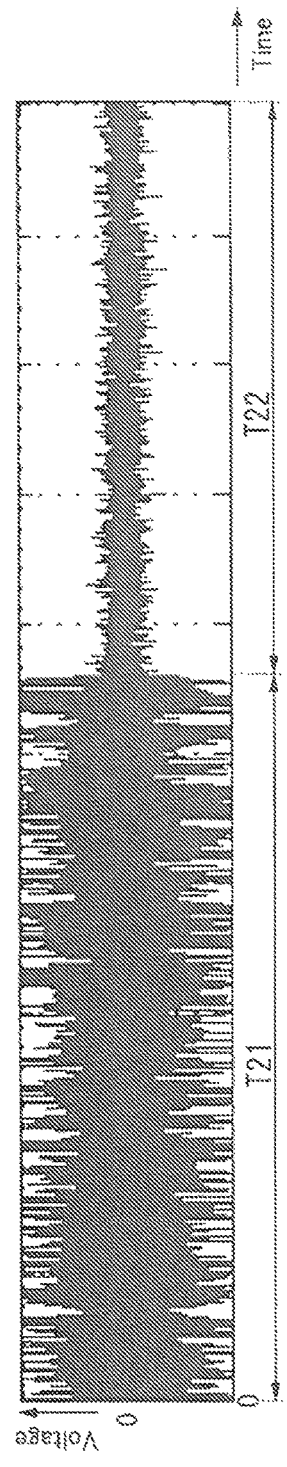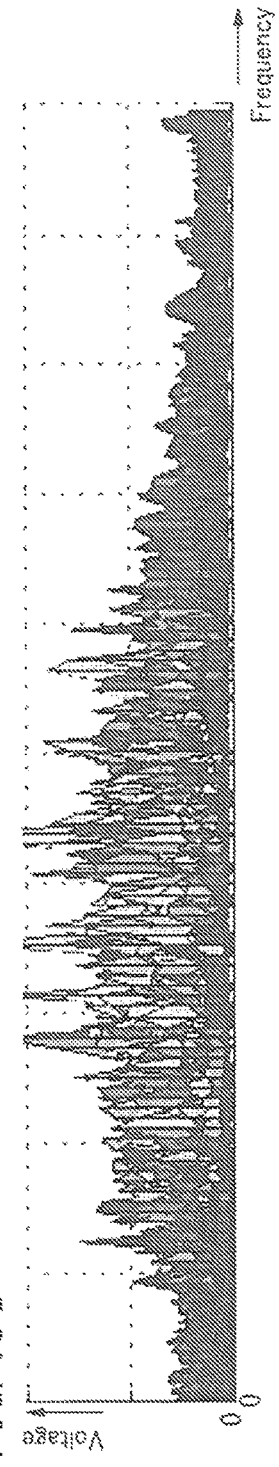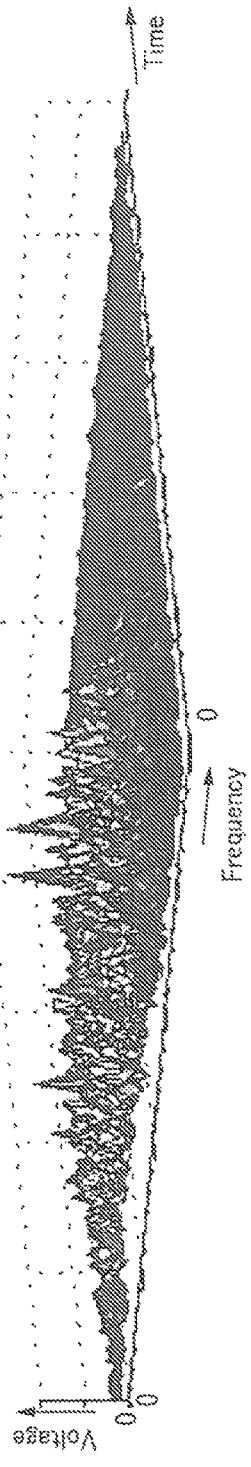

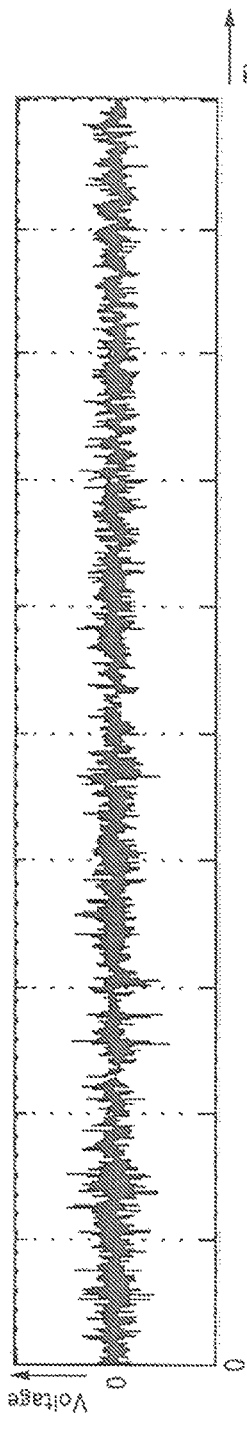
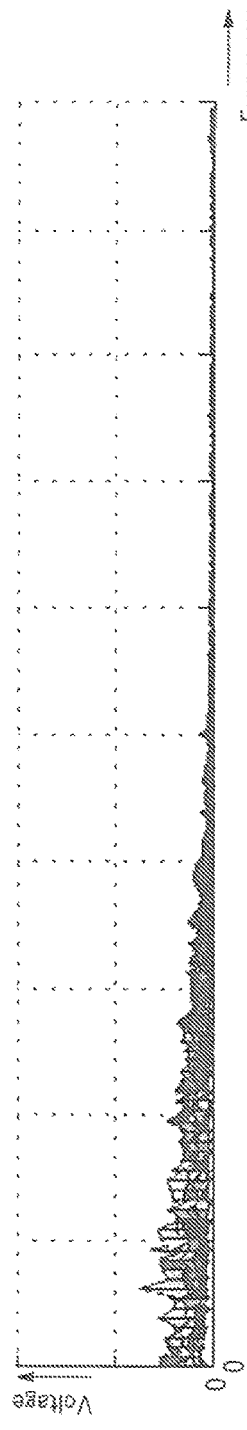
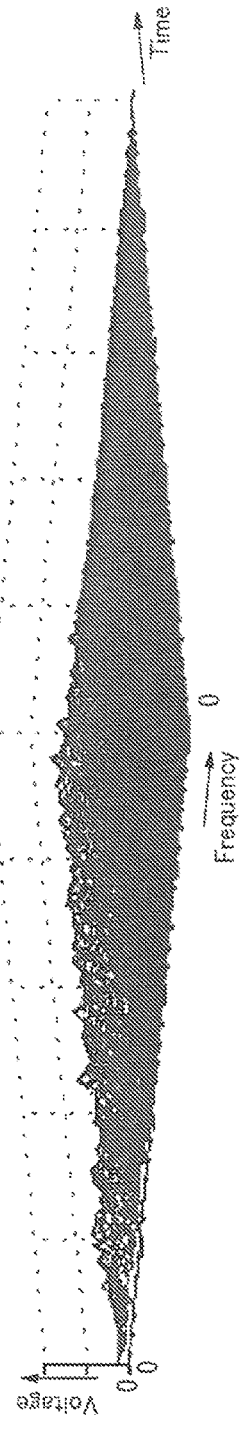
FIG. 21A
FIG. 21B
FIG. 21C

FAUCET

TECHNICAL FIELD

The present invention relates generally to faucets and particularly to a faucet which is installed in a kitchen, a bathroom, a restroom or the like and controls water discharging by use of a detector using radio waves.

BACKGROUND ART

In the past, there has been proposed, as a faucet installed in a kitchen, a bathroom, a restroom, or the like, an automatic faucet for determining whether to start or end water discharging according to a detection result of a detection object in a vicinity of a water outlet (e.g., see JP 5212908 B2). A detector for detecting the detection object may include a Doppler sensor for sending and receiving radio wave signals, and is to detect motion of the detection object based on comparison between an output of the Doppler sensor filtered with a filter and a threshold value.

In short, the detector of the conventional faucet recognizes the detection object based on intensities of signals in a particular band of time axis information.

However, the faucet including a conventional detector using radio waves is likely to cause miss detection and false detection. The miss detection means failing to detect the detection object when the detection object is in fact present. The false detection means determining that the detection object is present when the detection object is in fact not present.

For example, even if the detection object is in fact not present, the detector may receive a reflected wave reflected by a water flow discharged from the water outlet, and thereby erroneously recognizes that the detection object is present. This may occur frequently in a case where the water outlet discharges a relatively high pressure water shower.

When the detector includes a photosensor using infrared or the like, it has difficulty in detecting black or transparent objects. Additionally, the false detection may be caused by sunlight.

Hence, there may be a demand to realize a faucet which is unsusceptible to unwanted effects such as effects of a surrounding environment, and a color and a material of an object, and thus can accurately determine whether a detection object is present in a vicinity of a water outlet, irrespective of a water volume and a condition of a water flow (e.g., a shower and a stream).

SUMMARY OF INVENTION

In view of the above insufficiency, an objective of the present invention would be to propose a faucet which is unsusceptible to unwanted effects such as effects of a surrounding environment, and a color and a material of an object, and thus can accurately determine whether a detection object is present in a vicinity of a water outlet.

A faucet of one aspect of the present invention includes: a water outlet for discharging water; a detector configured to detect a detection object in a detection area containing a water discharge area in which the water discharged from the water outlet is present; and a controller configured to start and end supply of the water discharged from the water outlet based on a detection result of the detector. The detector includes: a sensor configured to send a radio wave signal and receive the radio wave signal reflected by an object to output a sensor signal corresponding to motion of the object; a frequency analyzer configured to convert the sensor signal into a frequency domain signal, and extract, by use of a group of individual filter banks with different frequency bands, signals of the individual filter banks from the frequency domain signal; a recognizer configured to perform a recognition process of detecting the detection object based on detection data containing at least one of a frequency distribution of signals based on the signals of the individual filter banks and a component ratio of signal intensities based on the signals of the individual filter banks; and a database device configured to store sample data containing at least one of a frequency distribution corresponding to the detection object and a component ratio of signal intensities corresponding to the detection object. The recognizer is configured to perform the recognition process based on comparison between the detection data and the sample data.

The faucet of the aspect according to the present invention can offer effect of being unsusceptible to unwanted effects such as effects of a surrounding environment, and a color and a material of an object, and thus being capable of accurately determining whether a detection object is present in a vicinity of a water outlet.

BRIEF DESCRIPTION OF DRAWINGS

FIG. 5A to FIG. 5C are explanatory diagrams of one example of a background signal remover according to the embodiment.

FIG. 18A to FIG. 18C are waveform charts of the sensor signal and the results of the frequency analysis process according to the embodiment.

FIG. 21A to FIG. 21C are waveform charts of the sensor signal and the results of the frequency analysis process according to the embodiment.

DESCRIPTION OF EMBODIMENTS

Figure 1:
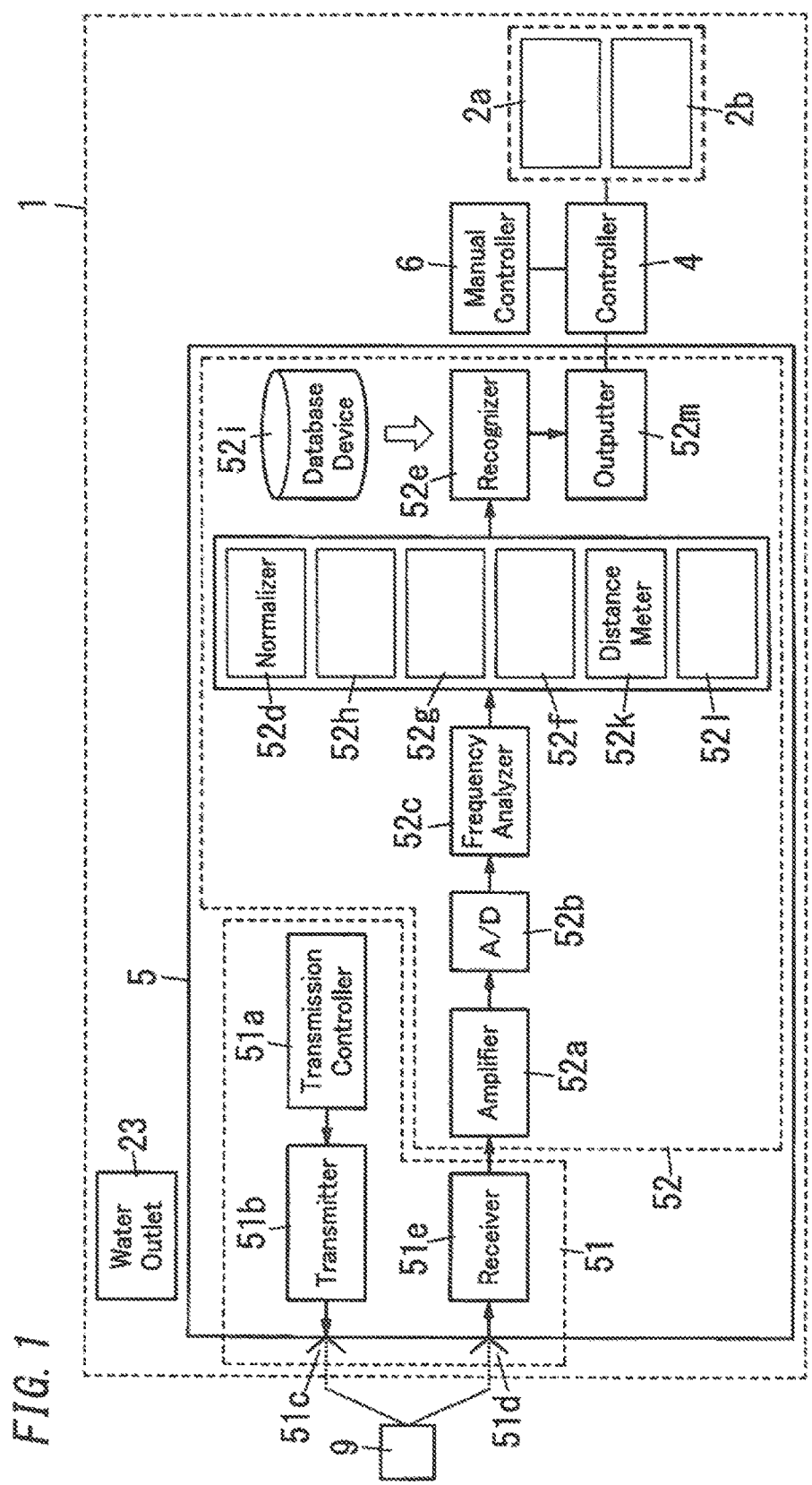
FIG. 1 is a block diagram of a configuration of a faucet of one embodiment.
Figure 2:
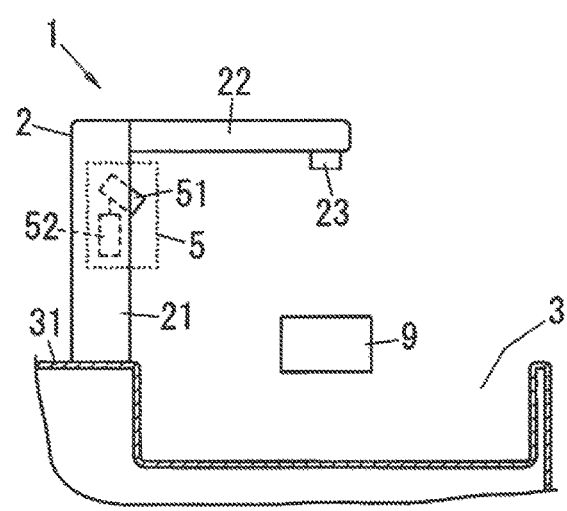
FIG. 2 is a partial side view of an appearance of equipment provided with the faucet according to the embodiment.

FIG. 1 shows a block configuration of a faucet 1 of the present embodiment. FIG. 2 shows an appearance of equipment including main components of the faucet 1. The faucet 1 mainly includes a spout 2 and a detector 5.

The spout 2 has inside a water supply channel allowing water (including hot water) to flow. As shown in FIG. 2, for example, the spout 2 is provided to an upper surface of a vicinity of a sink 3 of a kitchen to protrude from the upper surface, and the upper surface of the vicinity serves as a mounting surface 31 for the spout 2. The water supply channel of the spout 2 has an upstream end connected to an external water pipe serving as a water supply source or a hot water supply source, and also has a downstream end serving as a water outlet 23 for discharging water from the water supply channel to the sink 3.

The spout 2 has an inverted L-shape in its side view, and includes a main body including a base 21 protruding upward or diagonally upward from the mounting surface 31 and a protrusion 22 protruding forward from an upper part of the base 21.

The base 21 has inside an upstream part of the water supply channel. The protrusion 22 has inside a downstream part of the water supply channel. Further, the protrusion 22 includes the water outlet 23 in a lower surface of one end (front end) thereof. The water outlet 23 is provided so as to allow discharging water in a discharge direction being a downward direction (substantially vertically downward direction). The spout 2 discharges, substantially vertically downward from the water outlet 23, water which is supplied from the water pipe to the water supply channel.

Further, the water outlet 23 is configured to have selectable water discharging modes which include a shower mode of discharging a water shower and a stream mode of discharging a water stream.

The spout 2 includes a water discharge controller 2a configured to switch between an open mode of allowing the water outlet 23 to discharge water from the water supply channel and a closed mode of terminating discharging water from the water outlet 23 (as shown in FIG. 1). The water discharge controller 2a may be realized by a valve provided to the water supply channel and a driver for opening and closing the valve, for example.

Additionally, the spout 2 includes a flow rate controller 2b configured to adjust a flow rate of water discharged from the water outlet 23 (shown in FIG. 1). The flow rate controller 2b may be realized by an adjuster for adjusting an opening degree of the valve in the water supply channel, for example.

The spout 2 includes a controller 4 configured to control individual operations of the water discharge controller 2a and the flow rate controller 2b (shown in FIG. 1). Note that, the controller 4 may be placed outside the spout 2.

There is a manual controller 6 provided to a surface of the spout 2 (shown in FIG. 1). The manual controller 6 includes one or more manual operation switches for operating the flow rate controller 2b, and is configured to output a manual operation signal according to manual operation of the one or more manual operation switches to the controller 4. The controller 4 is configured to control operation of the flow rate controller 2b according to the manual operation signal.

Additionally, the faucet 1 includes the detector 5. The detector 5 is configured to detect a detection object 9 including particular motion inside the sink 3 such as movement of an object to be washed (e.g., dishes and foodstuffs) toward the water outlet 23, motion of the object to be washed inside the sink 3, motion of hands for washing, and disturbance of a discharged water flow caused by washing. Hereinafter, the detector 5 is described.

As shown in FIG. 1, the detector 5 includes a sensor 51 and a signal processor 52.

The sensor 51 is configured to send a radio wave with a predetermined frequency to a detection area, and receive a radio wave reflected by an object moving in the detection area, and output a sensor signal with a Doppler frequency corresponding to a difference between frequencies of the sent radio wave and the received radio wave. The sensor 51 may include a Doppler sensor or a sensor having a function of detecting speed information. The sensor signal is an analog time axis signal corresponding to motion of the object. Note that, when the object reflecting the radio wave is moving in the detection area, a frequency of the sensor signal is shifted according to a vertical component of a speed of the object relative to the sensor 51.

The sensor 51 includes a transmission controller 51a, a transmitter 51b, a transmission antenna 51c, a reception antenna 51d, and a receiver 51e. The sensor 51 is provided to the base 21 of the spout 2. The detection area of the sensor 51 is set based on a diagonally downward direction from the sensor 51 toward the sink 3. This detection area contains a water discharge area in which the water discharged from the water outlet 23 is present.

The transmitter 51b is configured to send a radio wave to the detection area through the transmission antenna 51c. The transmission controller 51a is configured to control a frequency and a sending timing of the radio wave sent from the transmitter 51b, for example. The radio wave sent from the transmitter 51b may be a millimeter wave with the frequency of 24.15 GHz, for example. The radio wave sent from the transmitter 51b is not limited to a millimeter wave and may be a micro wave. Further, this value is one example of the frequency of the radio wave to be sent from the transmitter 51b, and there is no intent to limit the frequency to this value.

The receiver 51e is configured to receive the radio wave reflected by the object in the detection area through the reception antenna 51d, and output the sensor signal having a frequency corresponding to a difference between frequencies of the sent radio wave and the received radio wave.

The signal processor 52 has a function of performing signal processing on the sensor signal outputted from the sensor 51. In FIG. 2, the signal processor 52 is provided to the base 21 of the spout 2 but may be provided outside the spout 2.

The signal processor 52 includes an amplifier 52a configured to amplify the sensor signal, and an A/D converter 52b configured to convert the sensor signal amplified by the amplifier 52a into a digital sensor signal and output the digital sensor signal. The amplifier 52a may include an amplifier including an operational amplifier, for example.

The signal processor 52 further includes a frequency analyzer 52c. The frequency analyzer 52c is configured to convert a time domain sensor signal outputted from the A/D converter 52b into a frequency domain signal (frequency axis signal) and extract, by use of a group of individual filter banks 5a (shown in FIG. 3A) with different frequency bands, signals of the individual filter banks 5a from the frequency domain signal.

In the frequency analyzer 52c, a predetermined number of (for example, sixteen) filter banks 5a is set as a group of filter banks 5a. However, this number is one example, and there is no intent to limit the number of filter banks 5a in one group to this number.

Further, the signal processor 52 includes a normalizer 52d. The normalizer 52d is configured to normalize intensities of the signals individually passing through the individual filter banks 5a by a sum of intensities of the signals extracted by the frequency analyzer 52c or a sum of intensities of signals individually passing through a plurality of predetermined filter banks 5a (for example, four filter banks on a lower frequency side) selected from the individual filter banks 5a to obtain normalized intensities, and output the normalized intensities.

The signal processor 52 further includes a recognizer 52e configured to perform a recognition process of detecting the detection object 9 based on a frequency distribution calculated from the normalized intensities of the individual filter banks 5a outputted from the normalizer 52d.

Figure 3A:
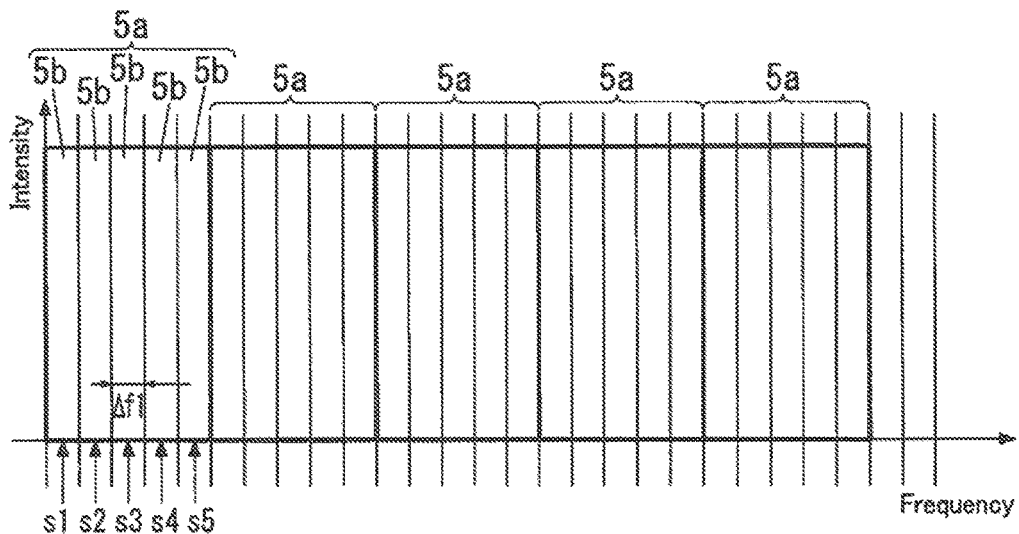
FIG. 3A to FIG. 3C are explanatory diagrams of a normalizer of a signal processor according to the embodiment.

The aforementioned frequency analyzer 52c has a function of converting the sensor signal outputted from the A/D converter 52b into the frequency domain signal by Discrete Cosine Transform (DCT). Further, as shown in FIG. 3A, each of the individual filter banks 5a includes a plurality of (in the illustrated example, five) frequency bins 5b. The frequency bin 5b of the filter bank 5a using DCT may be referred to as a DCT bin, in some cases. Each of the filter banks 5a has resolution depending on widths (Δf1 in FIG. 3A) of the frequency bins 5b. With regard to each of the filter banks 5a, this number is one example of the number of frequency bins 5b, and there is no intent to limit the number of frequency bins 5b to this number. The number of frequency bins 5b may be two or more other than five or may be one. Orthogonal transform for converting the sensor signal outputted from the A/D converter 52b into the frequency domain signal is not limited to DCT, and, for example may be Fast Fourier Transformation (FFT). The frequency bin 5b of the filter bank 5a using FFT may be referred to as an FFT bin, in some cases. Further, the orthogonal transform for converting the sensor signal outputted from the A/D converter 52b into the frequency domain signal may be Wavelet Transform (WT).

When each of the filter banks 5a includes a plurality of frequency bins 5b, it is preferable that the signal processor 52 include a smoothing processor 52f between the frequency analyzer 52c and the normalizer 52d. It is preferable that this smoothing processor 52f have at least one of following two smoothing processing functions (a first smoothing processing function and a second smoothing processing function). The first smoothing processing function is a function of performing smoothing processing on intensities of signals of the individual frequency bins 5b in a frequency domain (frequency axis direction) for each of the individual filter banks 5a. The second smoothing processing function is a function of performing smoothing processing on intensities of signals of the individual frequency bins 5b in a time axis direction for each of the individual filter banks 5a. Accordingly, the signal processor 52 can reduce undesired effects caused by noises, and more reduce the undesired effects caused by noises when the both functions are included.

The first smoothing processing function can be realized by use of, for example, an average filter, a weighted average filter, a median filter, a weighted median filter, or the like. When the first smoothing processing function is realized by use of an average filter, as shown in FIG. 3A and FIG. 4A, it is assumed that, at time $t_1$, intensities of signals of the individual five frequency bins 5b of the filter bank 5a which is the first one from the lower frequency side are represented by s1, s2, s3, s4, and s5, respectively. In this regard, with regard to the first filter bank 5a, when it is assumed that the intensity of the signal obtained by the smoothing processing by the first smoothing processing function is $m_{11}$ (see FIG. 3B and FIG. 4B), $m_{11}$ is equal to (s1+s2+s3+s4+s5)/5.

Figure 3B:
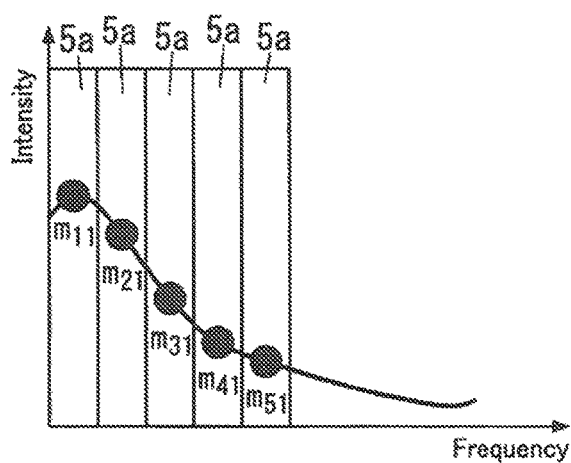
Figure 4A:
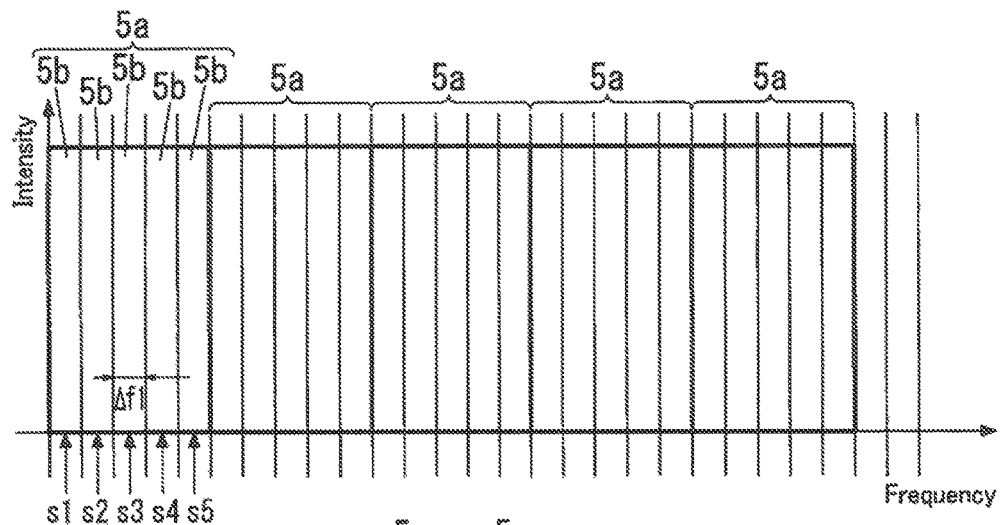
FIG. 4A to FIG. 4C are explanatory diagrams of a smoothing processor according to the embodiment.
Figure 4B:
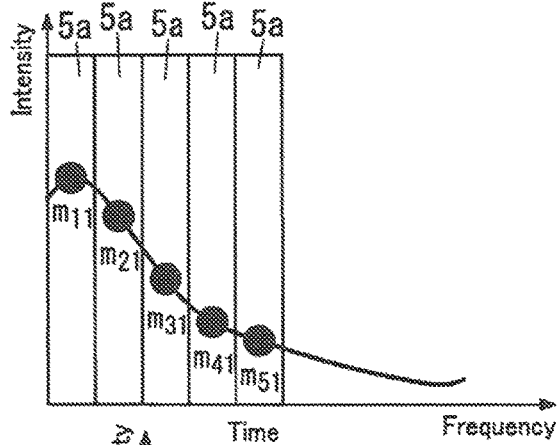

Similarly, as shown in FIG. 3B and FIG. 4B, the signals of the second filter bank 5a, the third filter bank 5a, the fourth filter bank 5a, and the fifth filter bank 5a are represented by $m_{21}$, $m_{31}$, $m_{41}$ and $m_{51}$, respectively. In summary, in the present embodiment, for convenience of explanation, $m_{ji}$ represents the intensity of the signal obtained by the smoothing processing realized by the first smoothing processing function on the signal of the j-th ("j" is a natural number) filter bank 5a at time $t_i$ ("i" is a natural number) in the time axis.

Figure 3C:
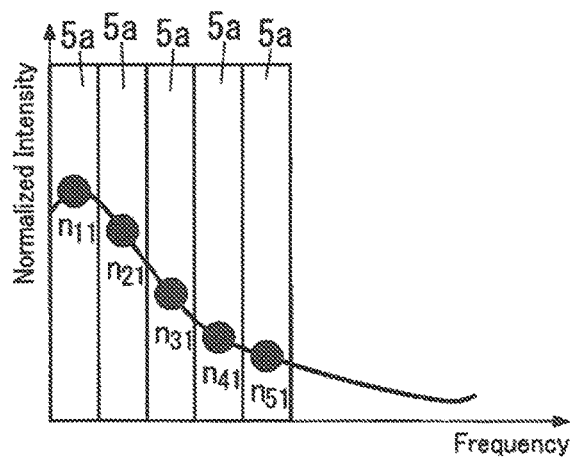

The normalizer 52d normalizes the intensities of the signals passing through the individual filter banks 5a by the sum of the intensities of the signals passing through the plurality of predetermined filter banks 5a used in the recognition process by the recognizer 52e. In this regard, in the following explanation, it is assumed that, for example, the total number of filter banks 5a in the frequency analyzer 52c is sixteen, and the plurality of predetermined filter banks 5a used for the recognition process are only the five filter banks which are the first to fifth filter banks from the lower frequency side. When the normalized intensity of the intensity $m_{11}$ of the signal passing through the first filter bank 5a at the time $t_1$ is $n_{11}$ (see FIG. 3C), the normalizer 52d can calculate the normalized intensity $n_{11}$ by use of the relation of $n_{11}=m_{11}/(m_{11}+m_{21}+m_{31}+m_{41}+m_{51})$.

Further, when each of the filter banks 5a is constituted by one frequency bin 5b, the normalizer 52d extracts the intensities of the signals passing through the individual filter banks 5a, and normalizes the intensities of the signals passing through the individual filter banks 5a by the sum of the intensities of these.

Figure 4C:
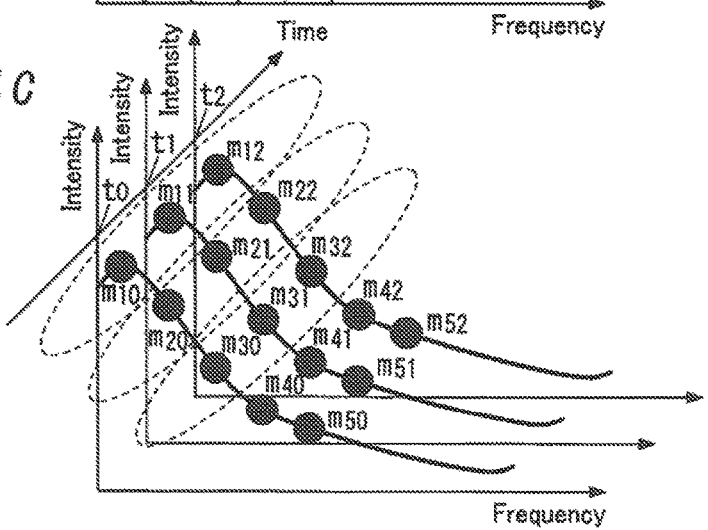

Further, the second smoothing processing function can be realized by use of, for example, an average filter, a weighted average filter, a median filter, a weighted median filter, or the like. In a case where the second smoothing processing function is realized by use of an average filter of calculating an average of intensities of a signal at a plurality of (for example, three) points in the time axis direction, as shown in FIG. 4C, with regard to the first filter bank 5a, when it is assumed that the intensity of the signal obtained by the smoothing processing by the second smoothing processing function is $m_1$, $m_1$ is equal to $(m_{10}+m_{11}+m_{12})/3$.

Similarly, when it is assumed that the intensities of the signals of the second filter bank 5a, the third filter bank 5a, the fourth filter bank 5a and the fifth filter bank 5a are represented by $m_2$, $m_3$, $m_4$ and $m_5$, $m_2$ is equal to $(m_{20}+m_{21}+m_{22})/3$, and $m_3$ is equal to $(m_{30}+m_{31}+m_{32})/3$, and $m_4$ is equal to $(m_{40}+m_{41}+m_{42})/3$, and $m_5$ is equal to $(m_{50}+m_{51}+m_{52})/3$.

In summary, in the present embodiment, for convenience of explanation, $m_n$ represents the intensity of the signal obtained by performing the smoothing processing by the first smoothing processing function on the signal of the n-th ("n" is a natural number) filter bank 5a and further performing the smoothing processing by the second smoothing processing function.

Additionally, it is preferable that the signal processor 52 include a background signal estimator 52g and a background signal remover 52h. The background signal estimator 52g is configured to estimate background signals (i.e., noise) included in the signals outputted from the individual filter banks 5a. The background signal remover 52h is configured to remove the background signals from the signals passing through the individual filter banks 5a. The background noise may include a mechanical signal of the sink 3, a fluctuation of a surface of water in the sink 3, and noise of adjacent electric equipment.

It is preferable that the signal processor 52 have operational modes including, for example, a first mode of estimating the background signals and a second mode of performing the recognition process and the first mode and the second mode be switched alternately at a predetermined time period (for example, 30 seconds) timed by a timer. In this regard, it is preferable that the signal processor 52 operate the background signal estimator 52g in a period of the first mode, and remove the background signals with the background signal remover 52h and then perform the recognition process with the recognizer 52e in a period of the second mode. The period of the first mode and the period of the second mode are not limited to having the same length (for example, 30 seconds) but may be different lengths.

The background signal remover 52h may be configured to remove the background signals by subtracting the background signals from the signals outputted from the filter banks 5a, for example. In this case, the background signal remover 52h may include, for example, a subtractor configured to subtract the intensities $b_1$, $b_2$, ..., (see FIG. 5A) of the background signals estimated by the background signal estimator 52g from the intensities of the signals $m_1$, $m_2$, ..., (see FIG. 5B) passing through the individual filter banks 5a. FIG. 5C shows the intensities of the signals obtained by subtracting the background signals from the signals in the same filter bank 5a. In this regard, when $L_1$ represents the intensity of the signal of the first filter bank 5a from left, $L_1$ is equal to $m_1-b_1$.

Similarly, when it is assumed that the intensities of the signals obtained by subtraction of the background signals of the second filter bank 5a, the third filter bank 5a, the fourth filter bank 5a and the fifth filter bank 5a are represented by $L_2$, $L_3$, $L_4$ and $L_5$, $L_2$ is equal to $m_2-b_2$, and $L_3$ is equal to $m_3-b_3$, and $L_4$ is equal to $m_4-b_4$, and $L_5$ is equal to $m_5-b_5$.

The background signal estimator 52g may estimate the intensities of the signals obtained in the period of the first mode with regard to the individual filter banks 5a as the intensities of the background signals of the individual filter banks 5a, and then updates the background signals as needed. Further, the background signal estimator 52g may estimate an average of intensities of a plurality of signals obtained in the first mode with regard to each of the individual filter banks 5a as the intensity of the background signal of each of the individual filter banks 5a. In other words, the background signal estimator 52g may treat an average in a time axis of a plurality of signals obtained in advance for each of the individual filter banks 5a as the background signal. In this case, the background signal estimator 52g can have an improved estimation accuracy of the background signals.

Figure 6:
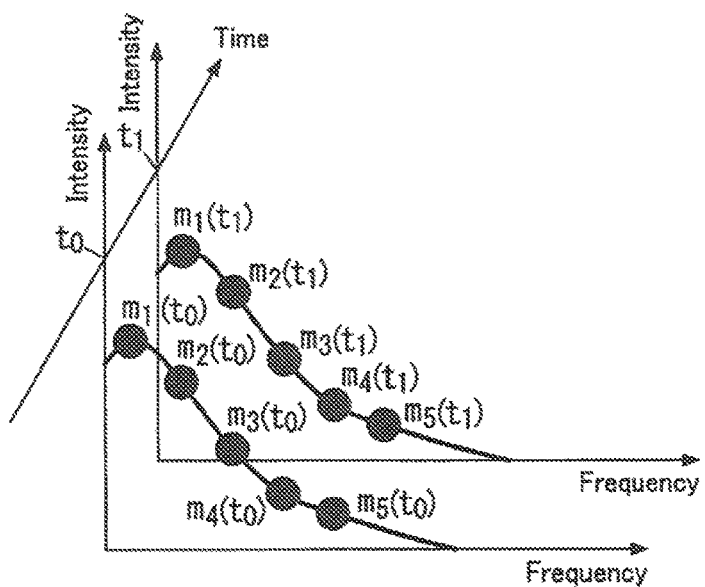
FIG. 6 is an explanatory diagram of another example of the background signal remover according to the embodiment.

Further, the background signal remover 52h may treat an immediately preceding signal (i.e., a previous signal) of each of the filter banks 5a as the background signal. In this case, the signal processor 52 may have a function of removing the background signals by subtracting the immediately preceding signals in the time axis before the signals are subjected to the normalization process by the normalizer 52d. In summary, with regard to the signals passing through the individual filter banks 5a, the background signal remover 52h may have a function of removing the background signals by subtracting, from the intensities of the signals to be subjected to the normalization process, intensities of signals sampled at one point in the time axis before the signals to be subjected to the normalization process. In this case, for example, as shown in FIG. 6, when it is assumed that the signals of the individual filter banks 5a at the time $t_1$ to be subjected to the normalization process are represented by $m_1(t_1)$, $m_2(t_1)$, $m_3(t_1)$, $m_4(t_1)$ and $m_5(t_1)$, and the signals at the time $t_0$ immediately before the time $t_1$ are represented by $m_1(t_0)$, $m_2(t_0)$, $m_3(t_0)$, $m_4(t_0)$ and $m_5(t_0)$, and the intensities of the signals after the subtraction are represented by $L_1$, $L_2$, $L_3$, $L_4$ and $L_5$, $L_1$ is equal to $m_1(t_1)-m_1(t_0)$, and $L_2$ is equal to $m_2(t_1)-m_2(t_0)$, and $L_3$ is equal to $m_3(t_1)-m_3(t_0)$, and $L_4$ is equal to $m_4(t_1)-m_4(t_0)$, and $L_5$ is equal to $m_5(t_1)-m_5(t_0)$.

In some cases, depending on circumstances of use of the signal processor 52, there is a possibility that the frequency bin 5b including a relatively large background signal (noise) may be known in advance. For example, in a case where apparatus to be energized by a commercial power source is present in a vicinity of the detector 5, there is a high possibility that relatively large background noise is included in the signal of the frequency bin 5b whose frequency band including a frequency (for example, 60 Hz, and 120 Hz) which is a relatively small multiple of a frequency of commercial power supply (for example, 60 Hz).

In contrast, with regard to the sensor signal outputted when the detection object 9 moves in the detection area, a frequency (Doppler frequency) of this sensor signal changes continuously according to a distance between the sensor 51 and the object and a moving speed of the object. In this case, the background signal does not occur constantly at a specific frequency.

In view of this, when the signal processor 52 is configured so that each of the individual filter banks 5a includes a plurality of frequency bins 5b, one of the frequency bins 5b in which the background signal is constantly included may be treated as a particular frequency bin $5b_i$. The background signal remover 52h may be configured to remove the background signal by not using an intensity of an actual signal of the particular frequency bin $5b_i$ but replacing the intensity of the actual signal of the particular frequency bin $5b_i$ by an intensity of a signal estimated based on intensities of signals of two frequency bins 5b adjacent to the particular frequency bin $5b_i$.

Figure 7A:
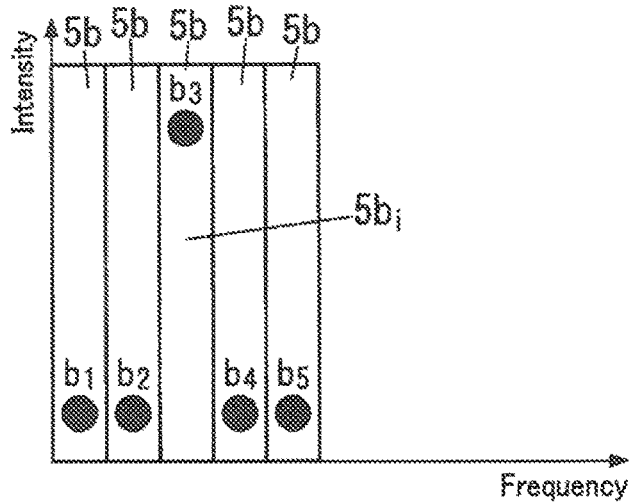
FIG. 7A and FIG. 7B are explanatory diagrams of another example of the background signal remover according to the embodiment.
Figure 7B:
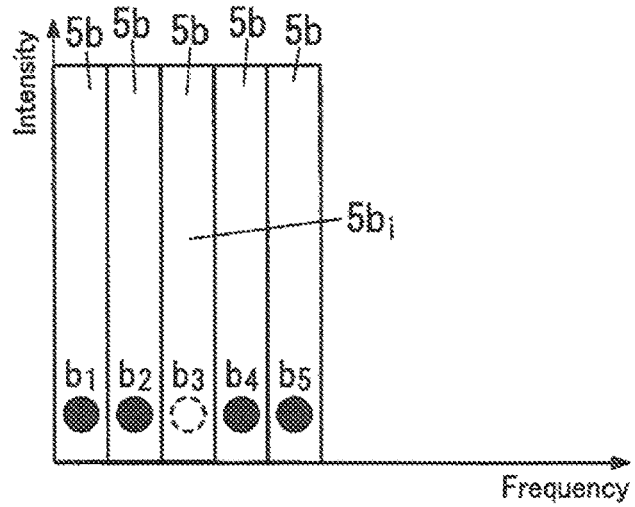

The third frequency bin 5b from left in FIG. 7A is assumed to be the particular frequency bin $5b_i$. The background signal remover 52h treats the signal (signal intensity $b_3$) of the particular frequency bin $5b_i$ as being invalid, and as shown in FIG. 7B, replaces it with the intensity $b_3$ of the signal component estimated based on the intensities $b_2$ and $b_4$ of the signal components of the two frequency bins 5b adjacent to the particular frequency bin $5b_i$. In the estimation, the estimated intensity $b_3$ of the signal is an average of the intensities $b_2$ and $b_4$ of the signal components of the two frequency bins 5b adjacent to the particular frequency bin $5b_i$, that is, $(b_2+b_4)/2$. In summary, when it is assumed that the i-th frequency bin 5b from the lower frequency side in the filter bank 5a is treated as the particular frequency bin $5b_i$ and the intensity of the signal of the particular frequency bin $5b_i$ is represented by $b_i$, $b_i$ can be defined by an estimation formula of $b_i=(b_{i-1}+b_{i+1})/2$.

Accordingly, the signal processor 52 can reduce, in a short time, undesired effects caused by background signals (noise) of a particular frequency which occurs constantly. Therefore, the signal processor 52 can have the improved detection accuracy of the detection object 9.

The background signal remover 52h may be an adaptive filter configured to remove the background signal by filtering the background signal in a frequency domain (frequency axis).

The adaptive filter is a filter configured to adjust by itself a transfer function (filter coefficient) according to an adaptive algorithm (optimization algorithm), and can be realized by use of a digital filter. This type of adaptive filter may preferably be an adaptive filter using DCT (Discrete Cosine Transform). In this case, the adaptive algorithm of the adaptive filter may be an LMS (Least Mean Square) algorithm of DCT.

Alternatively, the adaptive filter may be an adaptive filter using FFT. In this case, the adaptive algorithm of the adaptive filter may be an LMS algorithm of FFT. The LMS algorithm gives an advantage of reducing a calculation amount relative to a projection algorithm and an RLS (Recursive Least Square) algorithm, and the LMS algorithm of DCT requires only calculation of real numbers, and therefore gives an advantage of reducing an amount of calculation relative to the LMS algorithm of FFT which requires calculation of complex numbers.

Figure 8:
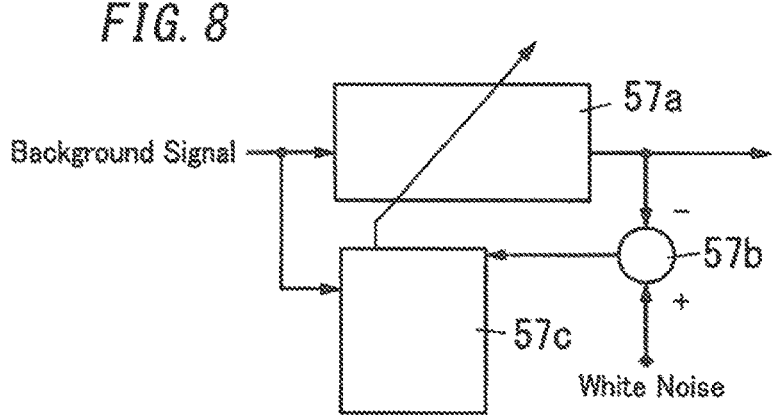
FIG. 8 is a block diagram of an adaptive filter serving as another example of the background signal remover according to the embodiment.

The adaptive filter has a configuration shown in FIG. 8, for example. This adaptive filter includes a filter 57a, a subtractor 57b, and an adaptive processor 57c. The filter 57a has a variable filter coefficient. The subtractor 57b outputs an error signal defined by a difference between an output signal of the filter 57a and a reference signal. The adaptive processor 57c generates a correction coefficient of a filter coefficient based on an input signal and the error signal according to the adaptive algorithm, and updates the filter coefficient. When background signals caused by thermal noises are given as an input signal of the filter 57a and the reference signal is a desired white noise, the adaptive filter can remove undesired background signals by filtering undesired background signals.

Further, by appropriately setting a forgetting factor of the adaptive filter, the background signal remover 52h may extract a frequency distribution of a signal obtained by filtering a long-term average background signal in a frequency axis. The forgetting factor is used in the calculation of updating the filter coefficient in order to exponentially decrease weights of previous data (filter coefficient) as the previous data is further away from the current data (filter coefficient), and exponentially increase weights of the previous data (filter coefficient) as the previous data is closer to the current data in the calculation of updating the filter coefficient. The forgetting factor is a positive number smaller than one, and for example is selected from a range of about 0.95 to 0.99.

The recognizer 52e performs the recognition process of detecting the detection object 9 based on the distribution in the frequency domain of the normalized intensities obtained by filtering by the filter banks 5a and normalizing by the normalizer 52d. In this regard, the meaning of "detect" includes "classify", "recognize", and "identify".

The recognizer 52e detects the detection object 9 by performing a pattern recognition process by principle component analysis, for example. This recognizer 52e operates according to a recognition algorithm using the principle component analysis. In order to operate such a type of recognizer 52e, the signal processor 52 preliminarily obtains learning data of a case where no detection object 9 is present in the detection area of the sensor 51 and pieces of learning data individually corresponding to different detection objects 9 present in the detection area (learning). Further, the signal processor 52 preliminarily stores in a database device 52i, sample data obtained by performing the principle component analysis on pieces of the learning data. In this regard, the sample data stored in the database device 52i in advance may include data used for pattern recognition, which means category data associating the motion of the object, the projection vector, and a determination border value with each other.

Figure 9:
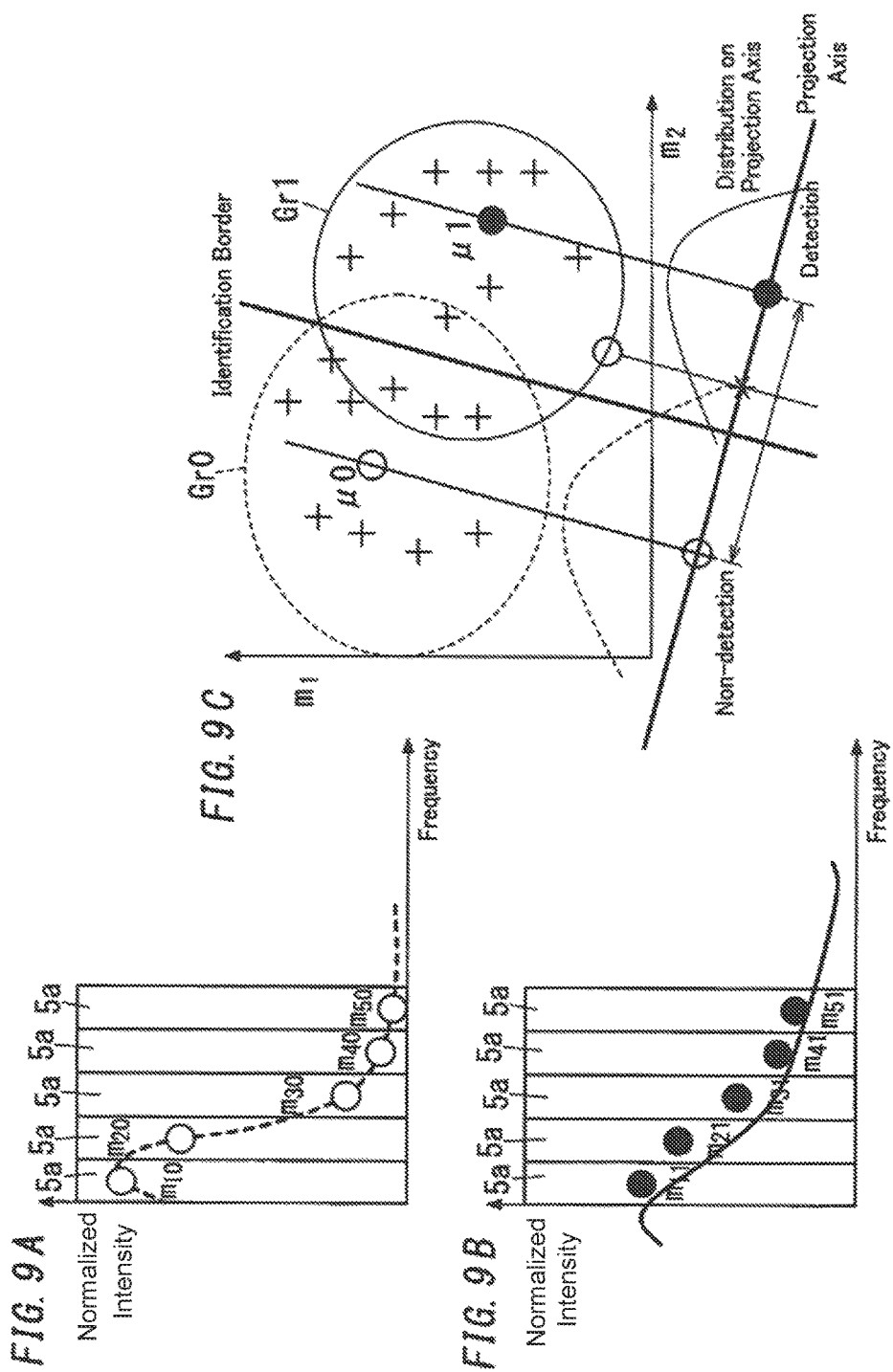
FIG. 9A to FIG. 9C are explanatory diagrams of a recognition process based on principle component analysis of the signal processor according to the embodiment.

For convenience of explanation, it is assumed that FIG. 9A shows a distribution in the frequency domain of the normalized intensities corresponding to the sample data of the case where the detection object 9 is not present in the detection area of the sensor 51. Additionally, FIG. 9B shows a distribution in the frequency domain of the normalized intensities corresponding to the sample data of the case where the detection object 9 is present in the detection area. In FIG. 9A, the normalized intensities of the signals passing through the individual filter banks 5a are represented by $m_{10}$, $m_{20}$, $m_{30}$, $m_{40}$ and $m_{50}$ from the lower frequency side. In FIG. 9B, the normalized intensities of the signals passing through the individual filter banks 5a are represented by $m_{11}$, $m_{21}$, $m_{31}$, $m_{41}$ and $m_{51}$ from the lower frequency side. In each of FIG. 9A and FIG. 9B, the sum of the normalized intensities of the signals passing through the three filter banks 5a on the lower frequency side is defined as a variable $m_1$, and the sum of the normalized intensities of the signals passing through the two filter banks 5a on the higher frequency side is defined as a variable $m_2$. In short, in FIG. 9A, $m_1$ is equal to $m_{10}+m_{20}+m_{30}$, and $m_2$ is equal to $m_{40}+m_{50}$. Further, in FIG. 9B, $m_1$ is equal to $m_{11}+m_{21}+m_{31}$, and $m_2$ is equal to $m_{41}+m_{51}$.

To imaginarily explain a two dimensional scatter diagram with orthogonal coordinate axes representing the two variables of $m_1$ and $m_2$, a projection axis, and a recognition border, FIG. 9C shows a two-dimensional graph of them. In FIG. 9C, a coordinate position of a scatter point ("+" in FIG. 9C) inside a region encircled by a broken line is represented by μ0 ($m_2$, $m_1$) and a coordinate position of a scatter point ("+" in FIG. 9C) inside a region encircled by a solid line is represented by μ1 ($m_2$, $m_1$). In the principle component analysis, a group Gr0 of data corresponding to the sample data of the case where the detection object 9 is not present in the detection area of the sensor 51 and a group Gr1 of data corresponding to the sample data of the case where the detection object 9 is present in the detection area are decided in advance. Further, in the principle component analysis, in FIG. 9C, the projection axis is determined to satisfy a condition that a difference between averages of distributions (schematically shown by a broken line and a solid line) of data obtained by projecting, onto the projection axis, the scatter points inside the regions encircled by the broken line and the solid line is maximized, and a further condition that variances of the distributions are maximized Thus, in the principle component analysis, a projection vector can be obtained for individual sample data.

The recognizer 52e tries to detect the detection object 9 based on the frequency domain distribution of the normalized intensities normalized by the normalizer 52d. In this case, the recognizer 52e performs the recognition process of detecting the detection object 9 based on comparison between the sample data and the detection data containing the frequency domain distribution of the normalized intensities normalized by the normalizer 52d. The recognizer 52e retrieves, from the database device 52i, the sample data corresponding to a current flow rate of discharged water and a current water discharging mode, and uses the retrieved sample data in the recognition process.

The signal processor 52 includes an outputter 52m configured to output the detection result from the recognizer 52e. When the recognizer 52e recognizes the detection object 9, the outputter 52m outputs an output signal indicating that the detection object 9 has been detected. When the recognizer 52e does not recognize motion of the detection object 9 in the detection area, the outputter 52m outputs an output signal indicating that the detection object 9 has not been detected yet.

In FIG. 1, components of the signal processor 52 except the amplifier 52a, the A/D converter 52b, the outputter 52m and the database device 52i can be realized by the microcomputer performing appropriate programs.

It is preferable that the signal processor 52 allows change of the aforementioned determination border value according to settings inputted from the outside. Accordingly, the signal processor 52 can adjust required probabilities of miss detection and erroneous detection (false detection) according to usage.

In the aforementioned signal processor 52, the frequency analyzer 52c converts the sensor signal (time axis signal) outputted from the A/D converter 52b into the frequency domain signal, and extract, by use of the group of individual filter banks 5a with different frequency bands, signals of the individual filter banks 5a from the frequency domain signal. The recognizer 52e performs the recognition process of detecting the detection object 9 based on comparison between the sample data and the detection data containing the frequency distribution of intensities of signals based on the signals of the individual filter banks 5a.

Even when the sensor signal has a short time period (e.g., several tens of ms) in which the frequency analysis such as DCT is performed, the sensor signal shows a unique frequency distribution (statistical distribution in a frequency domain) which differs among the detection objects 9. When the feature of the frequency distribution is used for detection of a particular one of the detection objects 9, the signal processor 52 can separate and recognize the detection objects different in the frequency distribution. Therefore, the signal processor 52 can reduce the probability of the false detection caused by objects and motions other than the detection object 9. In summary, the signal processor 52 can separate and detect the objects which are statistically different in the frequency distribution calculated from the intensities of the signals individually passing through the plurality of filter banks 5a, and thus the probability of the false detection can be reduced.

Further, in the filter bank 5a using FFT, in some cases, there is need to perform a process of multiplying a predetermined window function with the sensor signal before the FFT process, in order to reduce a side-lobe outside a desired frequency band (pass band). The window function may be selected from a rectangular window, a Gauss window, a hann window, and a hamming window, for example. In contrast, in the filter bank 5a using DCT, there is no need to use the window function. Therefore, the window function can be realized by a simple digital filter.

Further, the filter bank 5a using DCT is a process based on calculation of real numbers whereas the filter bank 5a using FFT is a process based on calculation of complex numbers (i.e., calculation of intensities and phases), and hence according to the filter bank 5a using DCT, an amount of calculation can be reduced. Further, in comparison between DCT and FFT with the same processing points, the frequency resolution of DCT is half of the frequency resolution of FFT. Hence, according to DCT, hardware resource such as the database device 52i can be down sized. For example, in the signal processor 52, when the sampling rate of the A/D converter 52b is 128 per second (e.g., the sampling frequency is 1 kHz), a DCT bin 5b has a width of 4 Hz whereas an FFT bin 5b has a width of 8 Hz. Note that, these numerical values are merely examples, and there is no intent of limitations.

The recognizer 52e may be configured to detect the detection object 9 based on the pattern recognition process by the principle component analysis, or may be configured to detect the object based on another pattern recognition process. For example, the recognizer 52e may be configured to detect the detection object 9 based on a pattern recognition process by KL transform or with a support vector machine (SVM), for example. When the signal processor 52 is configured so that the recognizer 52e performs the pattern recognition process by the principle component analysis or the pattern recognition process by KL transform, an amount of calculation at the recognizer 52e and an amount of a capacity of the database device 52i can be reduced.

Additionally or alternatively, the recognizer 52e may perform the recognition process of detecting the detection object 9 based on comparison between the sample data and the detection data containing a component ratio of normalized intensities of the signals of the individual filter banks 5a outputted from the normalizer 52d.

This type of recognizer 52e may be, for example, configured to detect the detection object 9 by performing the recognition process based on multiple linear regression analysis. In this case, the recognizer 52e operates according to a recognition algorithm using the multiple linear regression analysis.

Figure 10:
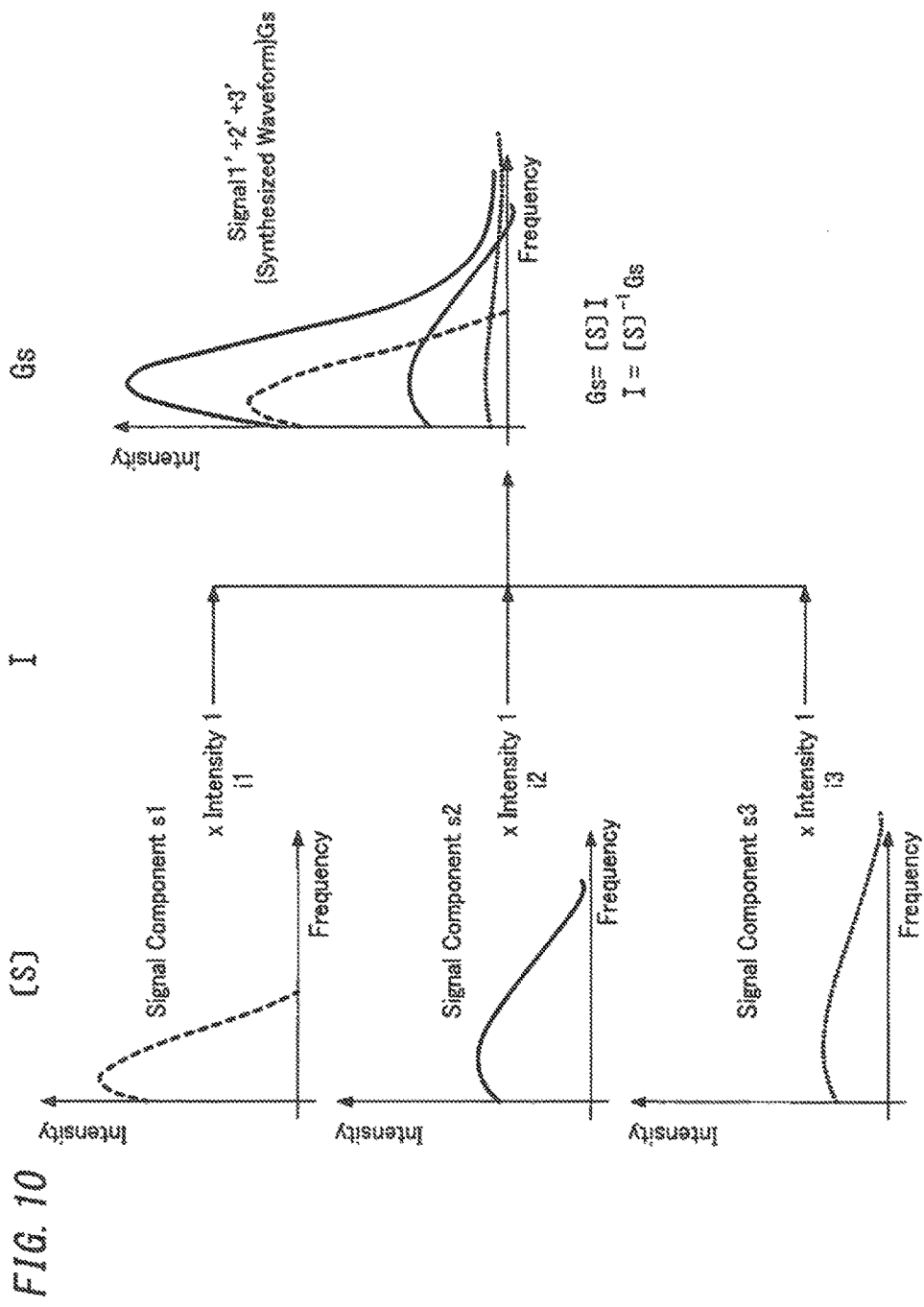
FIG. 10 is an explanatory diagram of a recognition process based on multiple linear regression analysis of the signal processor according to the embodiment.

In order to use such a type of recognizer 52e, the signal processor 52 preliminarily obtains learning data corresponding to the different detection objects 9 in the detection area of the sensor 51 (learning). Additionally, the signal processor 52 preliminarily stores sample data obtained by performing the multiple linear regression analysis on the learning data, in the database device 52i. FIG. 10 shows a synthesized waveform Gs of synthesis of a signal component s1, a signal component s2, and a signal component s3. According to the multiple linear regression analysis, the synthesized waveform Gs can be separated into the signal components s1, s2, and s3 by presumption, even when types of the signal components s1, s2, and s3, the number of signal components, and intensities of the signal components s1, s2, and s3 are unknown. In FIG. 10, [S] denotes a matrix whose matrix elements are the signal components s1, s2, and s3, and $[S]^{-1}$ denotes an inverse matrix of [S], and "I" denotes the component ratio (coefficient) of the normalized intensity. In this regard, the sample data preliminarily stored in the database device 52$i$ serves as sample data used in the recognition process, and data associating the detection object 9 with the signal components s1, s2, and s3.

Figure 11A:
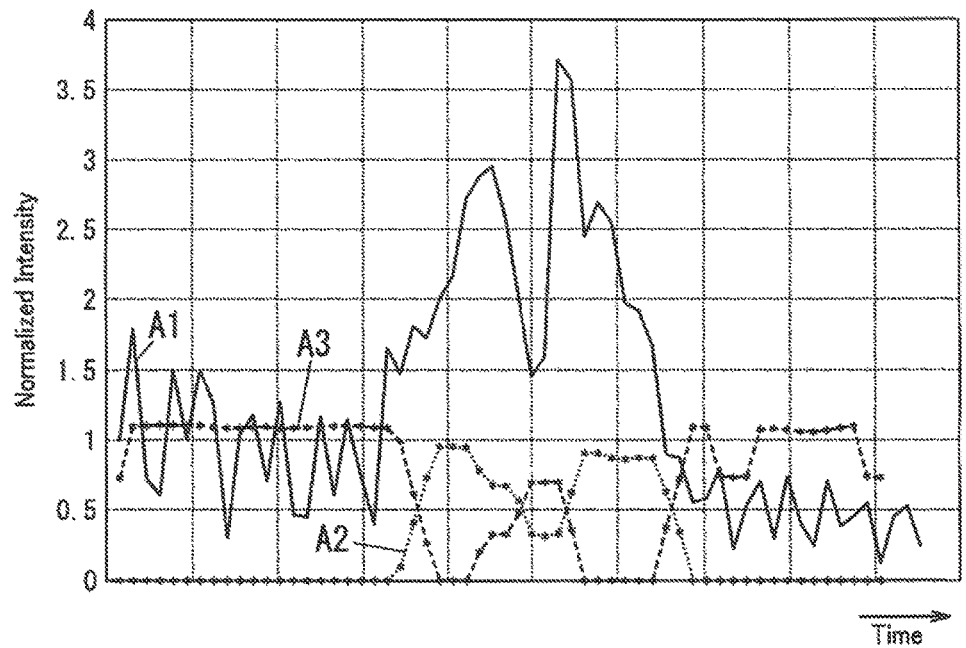
FIG. 11A and FIG. 11B are other explanatory diagrams of the recognition process based on multiple linear regression analysis of the signal processor according to the embodiment.

FIG. 11A shows a lateral axis denoting the time and a vertical axis denoting the normalized intensity. FIG. 11A shows A1 which represents data (corresponding to the aforementioned synthesized waveform Gs) in the time axis of the normalized intensities outputted from the normalizer 52$d$ when the detection object 9 is present in the detection area. Further, FIG. 11A also shows signal components A2 and A3 which are separated from data A1 by the multiple linear regression analysis. In this regard, the signal component A2 is a signal component derived from the detection object 9, and the signal component A3 is a signal component derived from motion of another object.

The recognizer 52$e$ performs the recognition process of detecting the detection object 9 based on comparison between the sample data and the detection data containing the component ratio (A2:A3) of the normalized intensities of the signals of the individual filter banks 5$a$ outputted from the normalizer 52$d$. The recognizer 52$e$ retrieves, from the database device 52$i$, the sample data corresponding to the detection object 9, and uses the retrieved sample data in the recognition process.

Figure 11B:
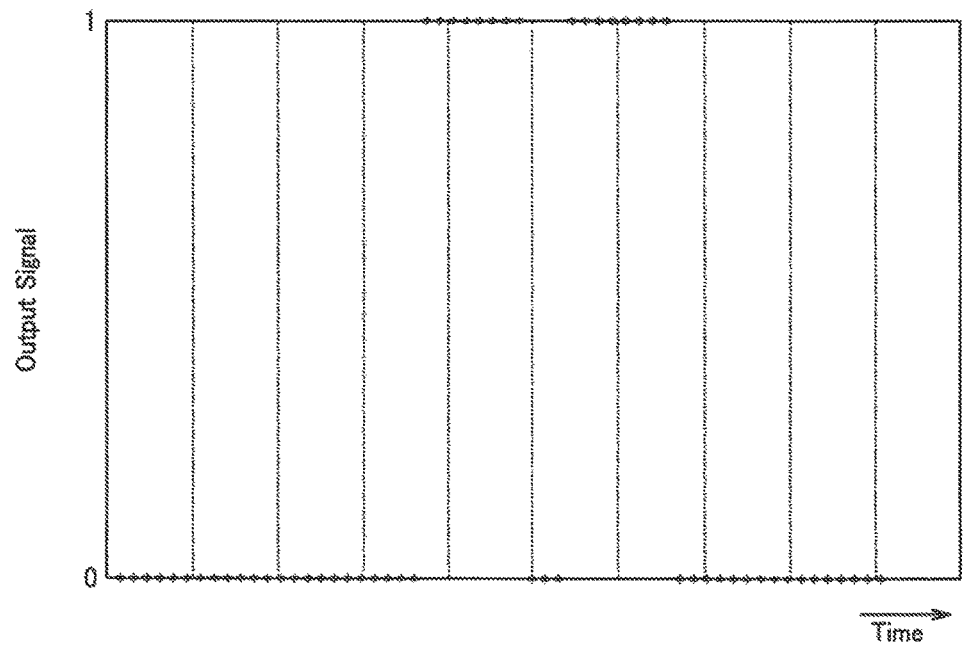

For example, FIG. 11B shows the output signal of the outputter 52$m$. In a case where A2 is larger than A3, the recognizer 52$e$ determines that the detection object 9 has been detected, and thus the output signal of the outputter 52$m$ has a high level (corresponding to "1", for example). In a case other than the case where A2 is larger than A3, the recognizer 52$e$ determines that the detection object 9 has not been detected yet, and thus the output signal of the outputter 52$m$ has a low level (corresponding to "0", for example). As apparent from FIG. 11B, it is confirmed that the probability of the false detection caused by an object other than the detection object 9 can be reduced.

It is preferable that the signal processor 52 allows change of the aforementioned determination condition (A2>A3) according to settings inputted from the outside. For example, it is preferable that the determination condition is set to A2>α×A3 and the coefficient α be allowed to be changed according to the settings inputted from the outside. Accordingly, the signal processor 52 can adjust required probabilities of miss detection and the erroneous detection (false detection) according to usage.

Note that, the recognizer 52$e$ may be configured to detect the detection object 9 based on the feature of the aforementioned frequency distribution and the component ratio of the normalized intensities. Therefore, the signal processor 52 can have the improved identification accuracy by the recognizer 52$e$.

Therefore, the faucet 1 including the aforementioned detector 5 can accurately detect particular motion such as movement of an object to be washed (e.g., dishes and foodstuffs) toward the water outlet 23, motion of the object to be washed inside the sink 3, motion of hands for washing, and disturbance of a discharged water flow caused by washing, while suppressing false detection. For example, even in a case where the detector 5 receives a reflected wave reflected by a water flow discharged from the water outlet 23, the faucet 1 can recognize disturbance of the discharged water flow. Consequently, the faucet 1 is unsusceptible to unwanted effect caused by magnitude of the water flow and thus can accurately detect the detection object 9.

Further, the detector 5 performs detection by use of radio wave signals, and thus can detect objects even if such objects are black or transparent, and additionally can suppress effects caused by intense light such as sunlight.

In summary, the faucet 1 including the aforementioned detector 5 is unsusceptible to unwanted effects such as effects of a surrounding environment, and a color and a material of the detection object 9, and thus can accurately determine whether the detection object 9 is present in a vicinity of the water outlet 23.

Further, the signal processor 52 may be configured to allow the recognizer 52$e$ to perform the recognition process or treat the recognition result by the recognizer 52$e$ as being valid, only when the sum of intensities of signal components of a plurality of predetermined filter banks 5$a$ before normalization by the normalizer 52$d$ is equal to or more than a threshold value. Alternately, the signal processor 52 may be configured to allow the recognizer 52$e$ to perform the recognition process or treat the recognition result by the recognizer 52$e$ as being valid, only when the weighted sum of intensities of signal components of a plurality of predetermined filter banks 5$a$ before normalization by the normalizer 52$d$ is equal to or more than a threshold value.

Figure 12A:
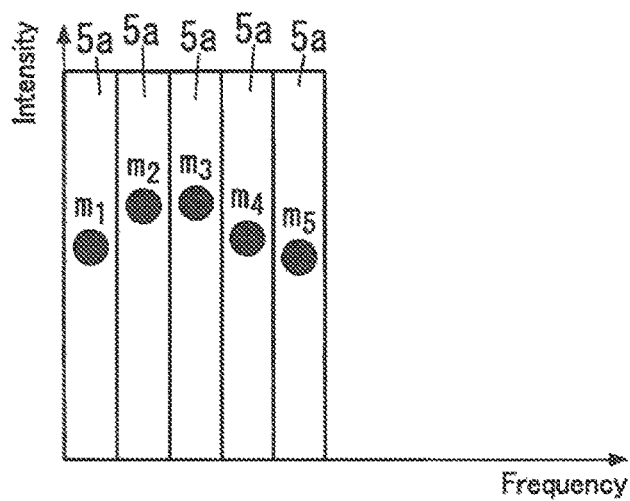
FIG. 12A and FIG. 12B are explanatory diagrams of the signal processor according to the embodiment.
Figure 12B:
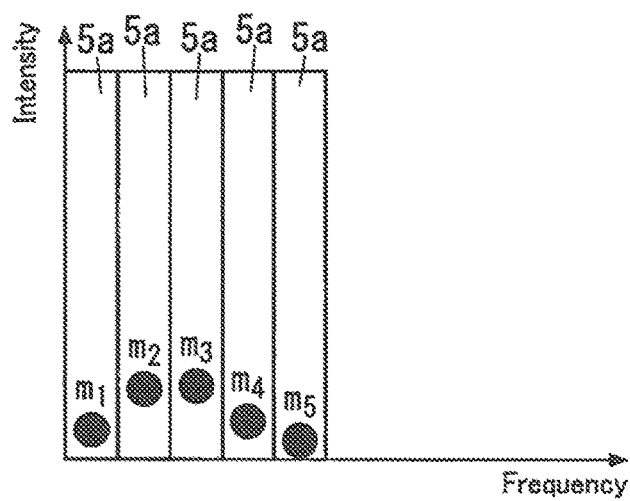

FIG. 12A and FIG. 12B relates to examples in which the intensities of the signals of the individual filter banks 5$a$ before being normalized by the normalizer 52$d$ are represented by $m_1$, $m_2$, $m_3$, $m_4$ and $m_5$ from the lower frequency side. FIG. 12A shows an example in which the sum of intensities $[m_1+m_2+m_3+m_4+m_5]$ is equal to or larger than the threshold value E1. FIG. 12B shows an example in which the sum of intensities $[m_1+m_2+m_3+m_4+m_5]$ is smaller than the threshold value E1.

Accordingly, the signal processor 52 can reduce the probability of the false detection. For example, the recognizer 52$e$ is configured to detect the detection object 9 based on the frequency distribution derived from the normalized intensities of the signal components. In this case, when the detection object 9 is not actually present in the detection area, there is a probability that the recognizer 52$e$ determines that the feature of the frequency distribution of the intensities of the signals due to the background noise resembles the feature of the frequency distribution of a case where the detection object 9 is present in the detection area, and thus causes the false detection. In view of this, to reduce the probability of the false detection, the signal processor 52 determines whether to perform the recognition process, based on pre-normalized intensities of signals.

Figure 13:
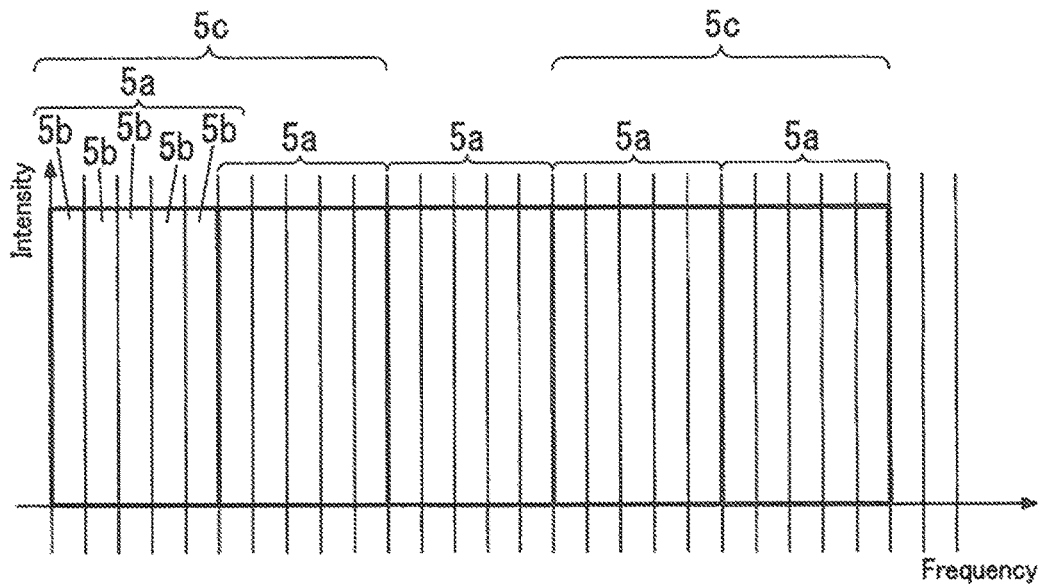
FIG. 13 is an explanatory diagram of a group of filter banks according to the embodiment.
Figure 14:
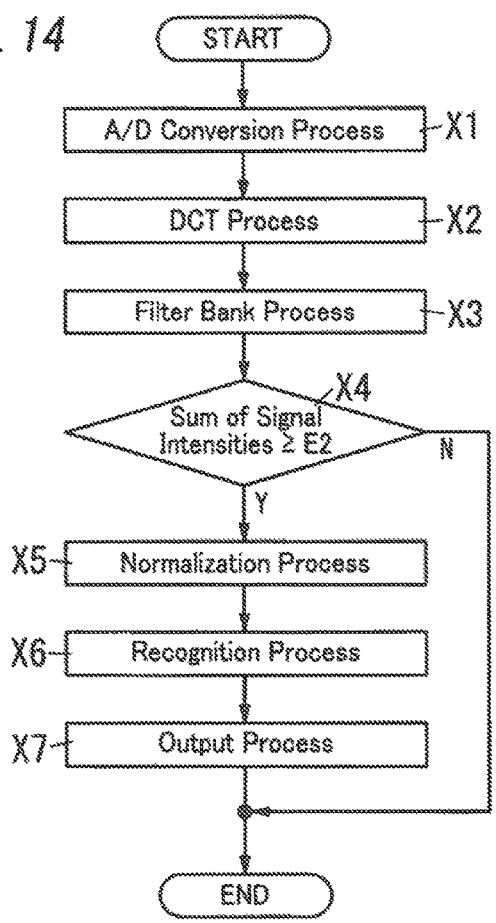
FIG. 14 is a flow chart of operation according to the embodiment.

Further, a plurality of predetermined filter banks 5$a$ before normalization by the normalizer 52$d$ may be treated as one group 5$c$ of filter banks (see FIG. 13). In this case, the signal processor 52 may determine whether the sum or weighted sum of pre-normalized intensities of signal components is equal to or more than a threshold value E2 for each of a plurality of groups 5$c$ of filter banks. In more detail, the signal processor 52 may be configured to, only when, with regard to any of the groups 5$c$ of filter banks, the sum of pre-normalized intensities of signal components is equal to or more than the threshold value E2, allow the recognizer 52$e$ to perform the recognition process or treat a result of the recognition process by the recognizer 52$e$ as being valid. Or, the signal processor 52 may be configured to, only when, with regard to all of the groups 5$c$ of filter banks, the sum or weighted sum of pre-normalized intensities of signal components is equal to or more than the threshold value E2, allow the recognizer 52e to perform the recognition process or treat a result of the recognition process by the recognizer 52e as being valid. Hereinafter, a series of processes including this determination process is described with reference to a flow chart shown in FIG. 14. Note that, hereinafter, the phrase "the sum or weighted sum of pre-normalized intensities of signal components" is abbreviated as the sum of pre-normalized intensities of signal components.

First, the A/D converter 52b performs an A/D conversion process of converting the sensor signal amplified by the amplifier 52a into the digital sensor signal and outputting the digital sensor signal (X1). Next, the frequency analyzer 52c performs a filter bank process of converting the sensor signal outputted from the A/D converter 52b into the frequency domain signal (frequency axis signal) by DCT process (X2) and extracting signals of the individual filter banks 5a (X3). For example, in a case of DCT with 128 points, it is considered that one hundred twenty eight frequency bins 5b are divided into bundles of five frequency bins 5b and thus twenty five filter banks 5a are obtained.

Next, for example, as shown in FIG. 13, with regard to each of two groups 5c of filter bank on the lower frequency side and the higher frequency side, the signal processor 52 calculates the sum of pre-normalized intensities of signals of a plurality of filter banks 5a constituting the group 5c of filter banks. Thereafter, the signal processor 52 performs a threshold-based determination process of determining whether the sum of intensities of signals is equal to or larger than the threshold value E2 for each group 5c of filter banks (X4).

When the sum of intensities of signals of any of the groups 5c of filter banks is equal to or larger than the threshold value E2, the signal processor 52 determines that the amplitude of the sensor signal outputted from the sensor 51 is large and therefore the possibility that the sensor signal is derived from background noise is low, and performs a normalization process by the normalizer 52d (X5). In short, the normalizer 52d normalizes intensities of signals passing through the individual filter banks 5a and outputs normalized intensities.

Thereafter, the recognizer 52e of the signal processor 52 performs the recognition process of recognizing the feature of the distribution of intensities of signal of individual frequency components of the plurality of filter banks 5a obtained by normalization, and determining whether the feature is derived from the detection object 9 (X6). When the recognizer 52e recognizes the detection object 9, the outputter 52m performs an output process of outputting the detection signal (X7).

In contrast, when the sum of intensities of signals of each of all the groups 5c of filter banks is smaller than the threshold value E2, the signal processor 52 determines that the amplitude of the sensor signal outputted from the sensor 51 is small and therefore the possibility that the sensor signal is derived from background noise is high. When determining that the possibility that the sensor signal is derived from background noise is high, the signal processor 52 does not perform subsequent processes including the normalization process by the normalizer 52d (X5 to X7).

Accordingly, the faucet 1 of the present embodiment includes the aforementioned detector 5 and thereby can suppress unwanted effects of background noise (e.g., a mechanical signal of the sink 3, a fluctuation of a water surface inside the sink 3, and noise of adjacent electric equipment) which is not related to the detection object 9. Consequently, the faucet 1 including the aforementioned detector 5 can accurately detect the particular motion such as movement of an object to be washed (e.g., dishes and foodstuffs) toward the water outlet 23, motion of the object to be washed inside the sink 3, motion of hands for washing, and disturbance of a discharged water flow caused by washing, while suppressing the false detection.

Note that, it is preferable that the recognizer 52e be configured to change the threshold value E1 or the threshold value E2 in the above threshold-based determination process or the sample data used for comparison in the recognition process, according to a condition of the water discharged from the water outlet 23. The condition of the water discharged from the water outlet 23 may include the discharging mode such as the shower mode and the stream mode, and the flow rate of the water discharged from the water outlet 23. Accordingly, this configuration can offer improvement of the accuracy of the recognition process performed by the recognizer 52e.

While the detector 5 does not detect the detection object 9, the controller 4 controls the water discharge controller 2a to stop water discharging. When the detector 5 detects the detection object 9 such as movement of an object to be washed toward the water outlet 23, motion of the object to be washed inside the sink 3, and motion of hands for washing, under a situation where water discharging is stopped, the controller 4 controls the water discharge controller 2a to start water discharging. When the detector 5 fails to detect the detection object 9 such as movement of an object to be washed toward the water outlet 23, motion of the object to be washed inside the sink 3, motion of hands for washing, and disturbance of the discharged water flow caused by washing during water discharging, the controller 4 controls the water discharge controller 2a to stop water discharging.

Accordingly, the faucet 1 including the aforementioned detector 5 can appropriately perform, according to presence or absence of the detection object 9, water discharging control of starting water discharging when the detection object 9 is present and ending water discharging when the detection object 9 is not present.

Figure 15A:
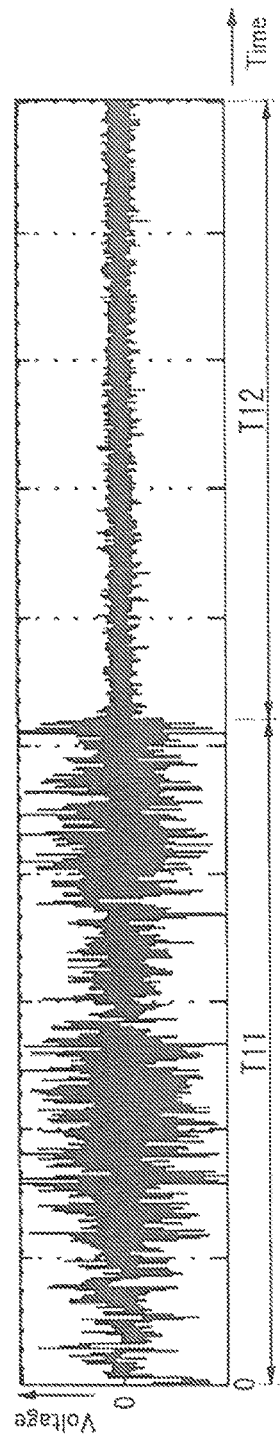
FIG. 15A to FIG. 15C are waveform charts of a sensor signal and results of a frequency analysis process according to the embodiment.
Figure 15B:
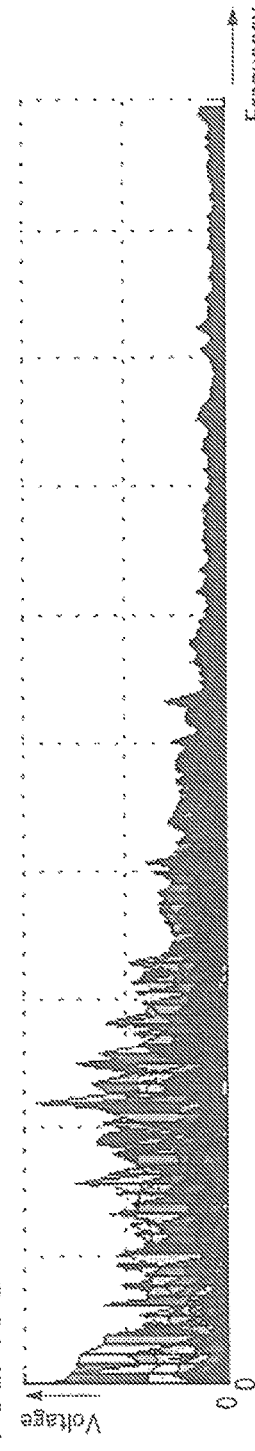
Figure 15C:
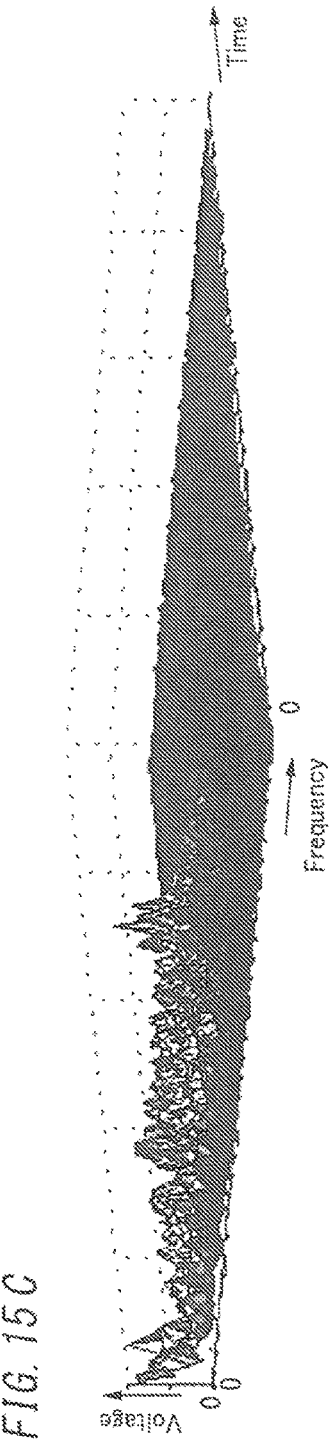

FIG. 15A to FIG. 15C show waveforms relating to a situation where a cup is washed with a water flow discharged from the water outlet 23 in the shower mode and then washing is ended. FIG. 15A shows a waveform of the sensor signal in the time axis, and a time period T11 represents a time period in which the cup is washed, and a time period T12 represents a time period in which the cup is not washed. FIG. 15B shows a result on the frequency axis, of the frequency analysis process using DCT performed by the frequency analyzer 52c on the sensor signal of FIG. 15A. FIG. 15C shows a result on the frequency axis and the time axis, of the frequency analysis process using DCT performed by the frequency analyzer 52c on the sensor signal of FIG. 15A.

Initially, the sensor signal is subjected to the frequency analysis process of the frequency analyzer 52c, and processes of the normalizer 52d, the background signal remover 52h, and the smoothing processor 52f. Thereafter, the recognizer 52e uses the multiple linear regression analysis, the principle component analysis, or the like, to extract a signal component derived from motions of the object to be washed (in this case, the cup) and hands in washing, and a signal component derived from disturbance of a flow of water discharged from the water outlet 23. Then the recognizer 52e performs component analysis on the extracted signal component derived from the motions of the object to be washed and hands, and the extracted signal component derived from the disturbance of the water flow discharged from the water outlet 23, or estimates shapes of frequency domain distributions of the signal components.

In the following description, the recognizer 52e performs the recognition process based on the multiple linear regression analysis. The signal component derived from the motions of the object to be washed and hands in washing is referred to as "signal component derived from motions of object to be washed and hands" and denoted by a reference sign ma1. Further, the signal component derived from the disturbance of the water flow discharged from the water outlet 23 is referred to as "signal component derived from water flow disturbance" and denoted by a reference sign mb1.

Additionally, with regard to the signal derived from the motions of the object to be washed and hands, the recognizer 52e calculates the sum of normalized intensities of signals individually passing through individual filter banks 5a on the lower frequency side, and the sum of normalized intensities of signals individually passing through individual filter banks 5a on the higher frequency side. In the following description, the sum of normalized intensities of signals individually passing through individual filter banks 5a on the lower frequency side is referred to as "sum of lower frequency side normalized intensities" and denoted by a reference sign ma11. Further, the sum of normalized intensities of signals individually passing through individual filter banks 5a on the higher frequency side is referred to as "sum of higher frequency side normalized intensities" and denoted by a reference sign ma12.

Figure 16:
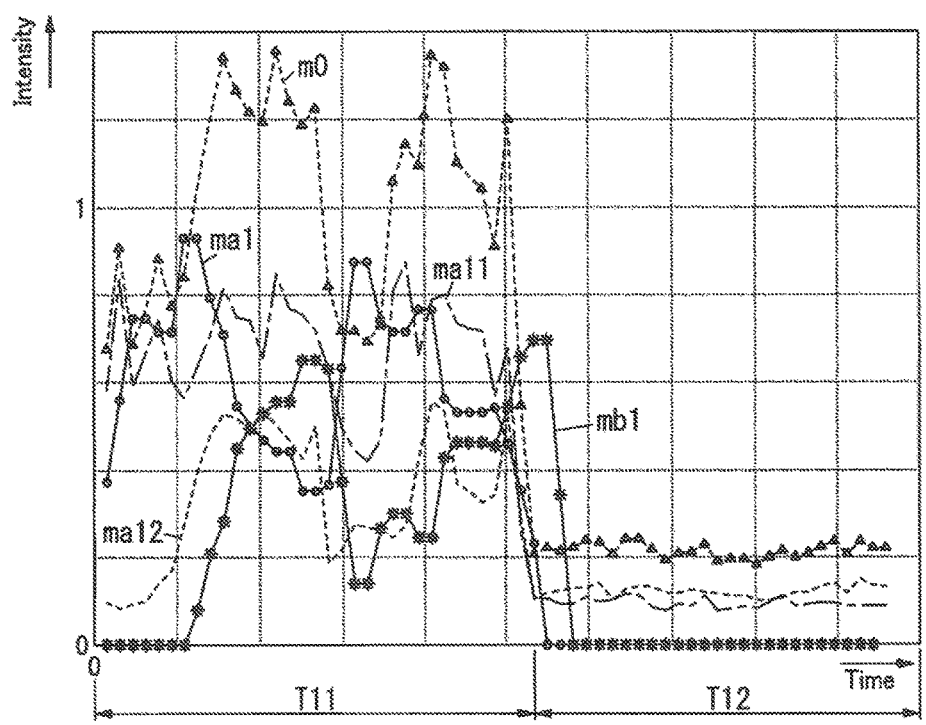
FIG. 16 is a waveform chart resulting from signal component analysis according to the embodiment.

FIG. 16 shows a result of the component analysis performed on the sensor signal by the recognizer 52e based on the multiple linear regression analysis. A signal component m0 corresponds to a total signal intensity of components of the sensor signal. FIG. 16 shows the total signal intensity m0, and individual signal intensities of the signal component ma1 derived from motions of object to be washed and hands and the signal component mb1 derived from water flow disturbance, the sum ma11 of lower frequency side normalized intensities of the signal component ma1, and the sum ma12 of higher frequency side normalized intensities of the signal component ma1.

The signal component ma1 derived from motions of object to be washed and hands corresponds to the signal component s1 in FIG. 10 based on technical concepts, for example. The signal component mb1 derived from water flow disturbance corresponds to the signal component s2 in FIG. 10. Additionally, the values of the signal components ma11 and ma12 are used in the threshold-based determination process using the threshold value E1 or the threshold value E2 as described above.

Figure 17:
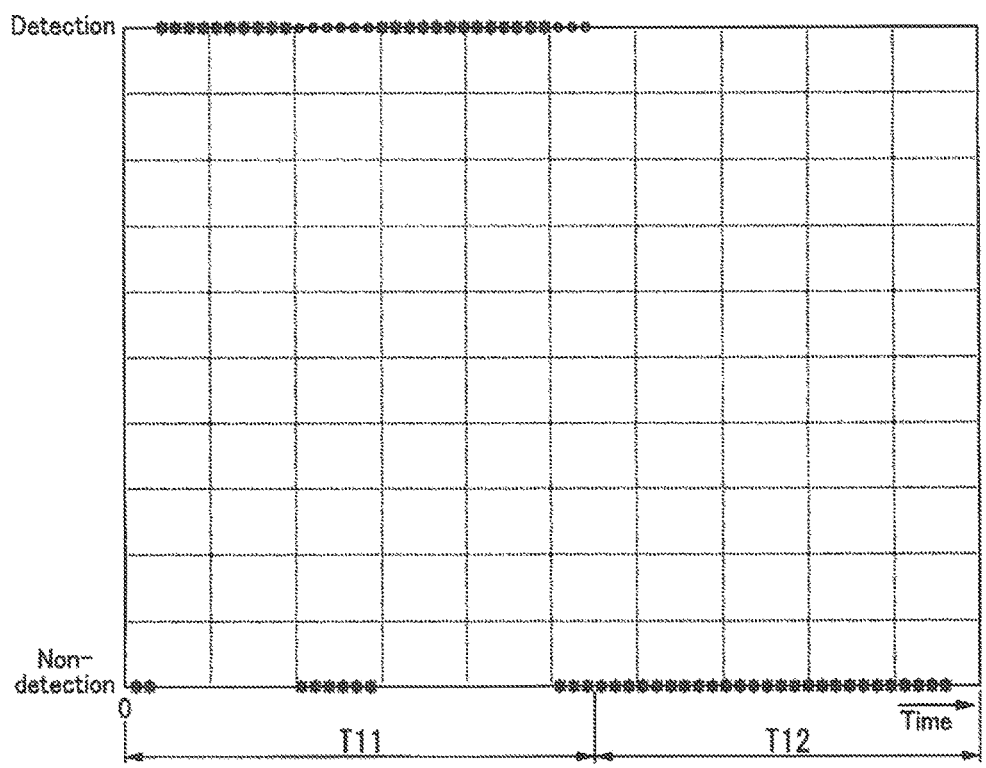
FIG. 17 is an explanatory diagram of a detection result of a detection object according to the embodiment.

FIG. 17 shows a detection result of the detection object 9 from the recognizer 52e. In FIG. 17, "*" represents the detection result relating to motions of the cup and hands in washing (ma1), and "○" represents the detection result relating to the disturbance of the water flow discharged from the water outlet 23 (mb1). The recognizer 52e detects motions of the cup and hands in washing, and the water flow disturbance in discharging water, based on the pattern recognition of the frequency distribution. The recognizer 52e calculates a logical disjunction of the detection result relating to the motions of the cup and hands in washing and the detection result relating to the water flow disturbance in discharging water. Thereby, the current state is set to the detection state during the time period T11, and the current state is set to the non-detection state during the time period T12.

Note that, in a situation relating to reverse of the sequence of FIG. 15A, a person may wait for a while without washing the cup after the water outlet 23 discharges water, and then starts washing the cup. Also in this situation, the detection object 9 is detected while the cup is washed, and the detection object 9 is not detected during the time period in which the cup is not washed.

Next, FIG. 18A to FIG. 18C show waveforms relating to a situation where a cup is washed with the water flow discharged from the water outlet 23 in the shower mode and then washing is ended. Notably, the current volume of discharged water is about double of that in the situation of FIG. 15A to FIG. 15C.

FIG. 18A shows a waveform of the sensor signal in the time axis, and a time period T21 represents a time period in which the cup is washed, and a time period T22 represents a time period in which the cup is not washed. FIG. 18B shows a result on the frequency axis, of the frequency analysis process using DCT performed by the frequency analyzer 52c on the sensor signal of FIG. 18A. FIG. 18C shows a result on the frequency axis and the time axis, of the frequency analysis process using DCT performed by the frequency analyzer 52c on the sensor signal of FIG. 18A.

Figure 19:
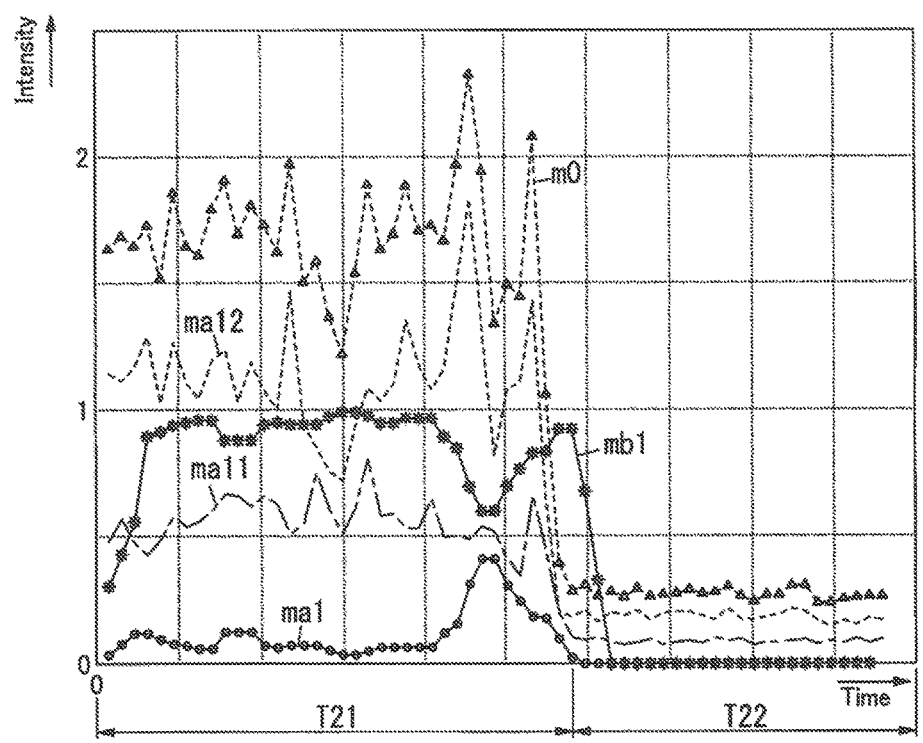
FIG. 19 is a waveform chart resulting from the signal component analysis according to the embodiment.

The recognizer 52e uses the result of the frequency analysis process performed by the frequency analyzer 52c to extract the signal component derived from motions of object to be washed (in this case, the cup) and hands, and the signal component derived from water flow disturbance. FIG. 19 shows a result of the component analysis performed on the sensor signal (the total signal intensity m0 of components of the sensor signal) by the recognizer 52e based on the multiple linear regression analysis. The recognizer 52e calculates the individual signal intensities of the signal component ma1 derived from motions of object to be washed and hands and the signal component mb1 derived from water flow disturbance, and the sum ma11 of lower frequency side normalized intensities of the signal component ma1 and the sum ma12 of higher frequency side normalized intensities of the signal component ma1.

The signal intensity in the time period T22 in which the cup is not washed in FIG. 19 is larger than the signal intensity in the time period T12 in which the cup is not washed in FIG. 16, but is similar in behavior thereto.

Figure 20:
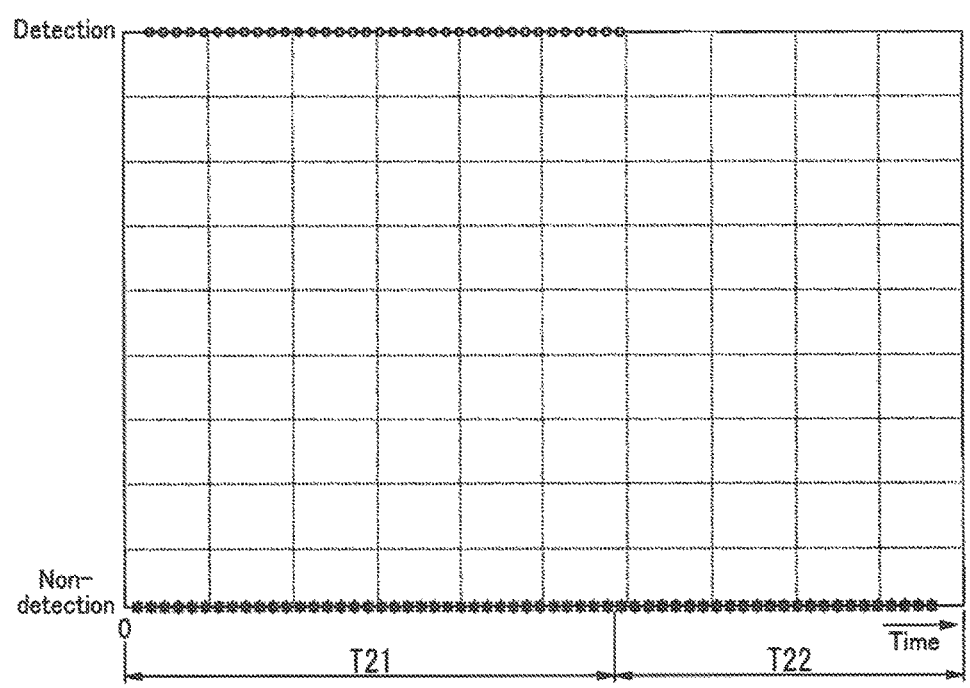
FIG. 20 is an explanatory diagram of the detection result of the detection object according to the embodiment.

FIG. 20 shows a detection result of the detection object 9 from the recognizer 52e. In FIG. 20, "*" represents the detection result relating to motions of the cup and hands in washing (ma1), and "○" represents the detection result relating to the disturbance of the flow of the water discharged from the water outlet 23 (mb1). The recognizer 52e calculates a logical disjunction of the detection result relating to motions of the cup and hands in washing and the detection result relating to the water flow disturbance in discharging water. Thereby, the current state is set to the detection state during the time period T21, and the current state is set to the non-detection state during the time period T22.

Next, FIG. 21A to FIG. 21C show waveforms relating to a situation where tips of chopsticks are washed with water discharged from the water outlet 23 in the stream mode. Notably, the current volume of discharged water is equal to that in the situation of FIG. 15A to FIG. 15C.

FIG. 21A shows a waveform of the sensor signal in the time axis. FIG. 21B shows a result versus the frequency axis, of the frequency analysis process using DCT performed by the frequency analyzer 52c on the sensor signal of FIG. 21A. FIG. 21C shows a result versus the frequency axis and the time axis, of the frequency analysis process using DCT performed by the frequency analyzer 52c on the sensor signal of FIG. 21A.

Figure 22:
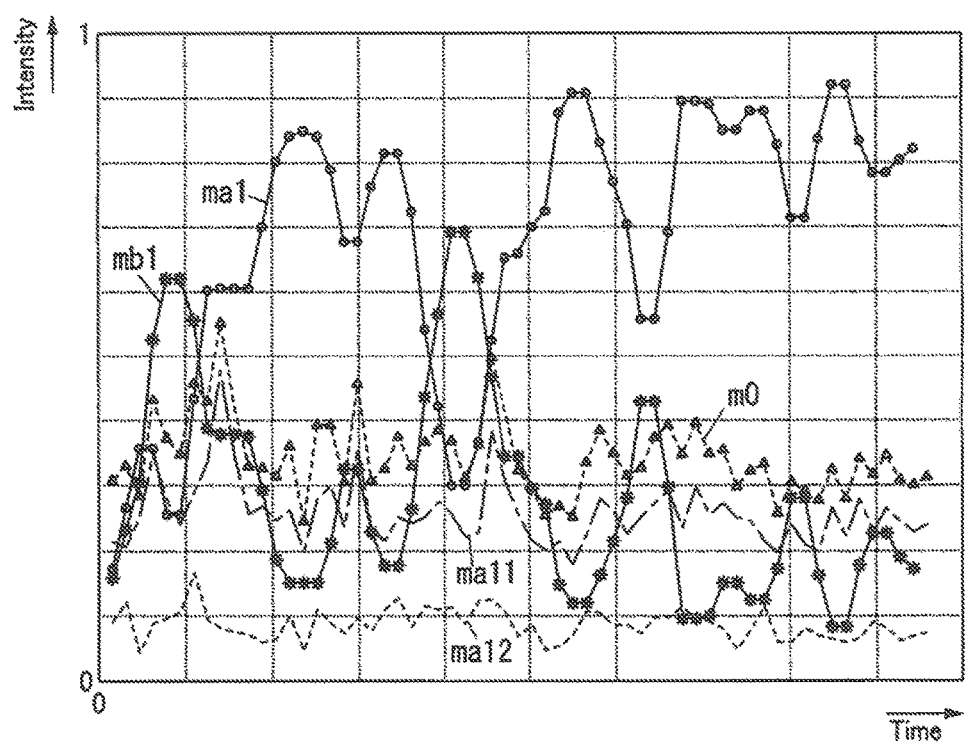
FIG. 22 is a waveform chart resulting from the signal component analysis according to the embodiment.

The recognizer 52e uses the result of the frequency analysis process performed by the frequency analyzer 52c to extract the signal component derived from motions of object to be washed (in this case, the tips of chopsticks) and hands, and the signal component derived from water flow disturbance. FIG. 22 shows a result of the component analysis performed on the sensor signal (the total signal intensity m0 of components of the sensor signal) by the recognizer 52e based on the multiple linear regression analysis. The recognizer 52e calculates the individual signal intensities of the signal component ma1 derived from motions of object to be washed and hands and the signal component mb1 derived from water flow disturbance, and the sum ma11 of lower frequency side normalized intensities of the signal component ma1 and the sum ma12 of higher frequency side normalized intensities of the signal component ma1.

Figure 23:
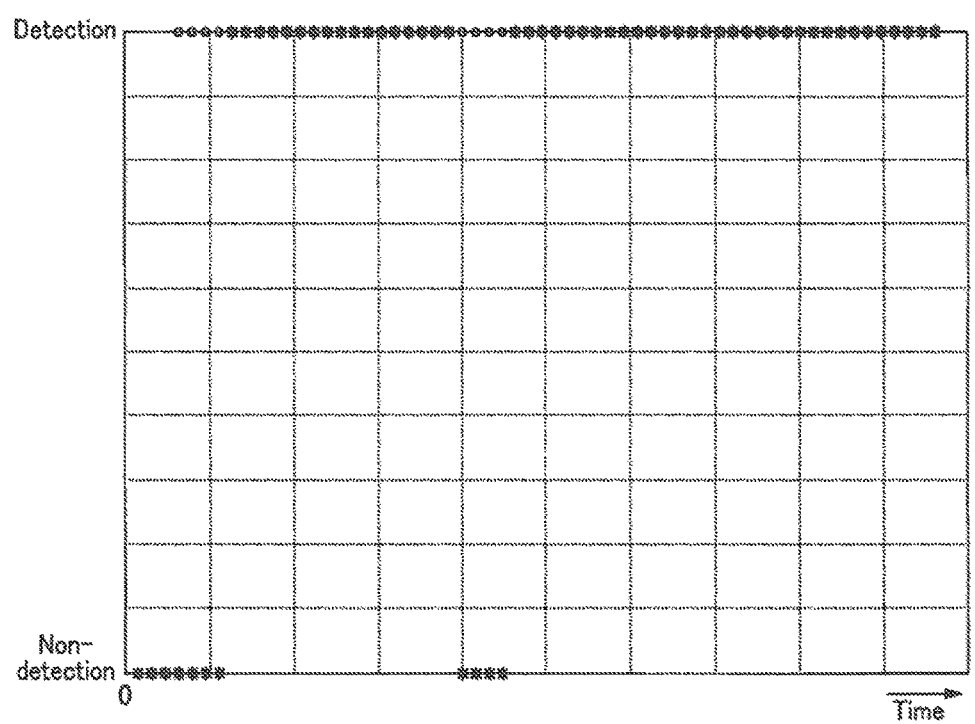
FIG. 23 is an explanatory diagram of the detection result of the detection object according to the embodiment.

FIG. 23 shows a detection result of the detection object 9 from the recognizer 52e. In FIG. 23, represents the detection result relating to motions of the chopsticks and hands in washing (ma1), and "○" represents the detection result relating to the disturbance of the water flow discharged from the water outlet 23 (mb1). In this case, the amplitude of the sensor signal while the tips of chopsticks are washed (see FIG. 21A) is almost equal to the amplitude of the sensor signal in the time period T22 in which the cup is not washed in FIG. 18A. However, the recognizer 52e can detect motions of the chopsticks and hands in washing and the disturbance of the water flow discharged from the water outlet 23, based on the pattern recognition of the frequency distribution. The recognizer 52e calculates a logical disjunction of the detection result relating to motions of the chopsticks and hands in washing and the detection result relating to the water flow disturbance in discharging water, and thereby can accurately detect motion of the tips of chopsticks in washing.

Figure 24A:
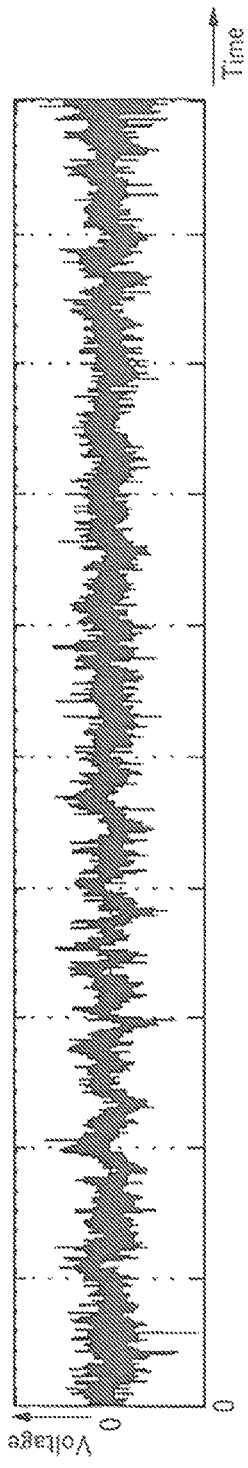
FIG. 24A to FIG. 24C are waveform charts of the sensor signal and the results of the frequency analysis process according to the embodiment.
Figure 24B:
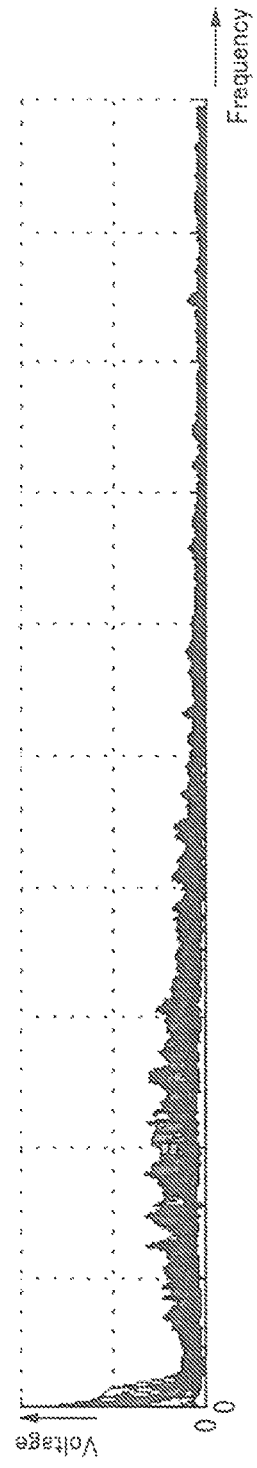
Figure 24C:
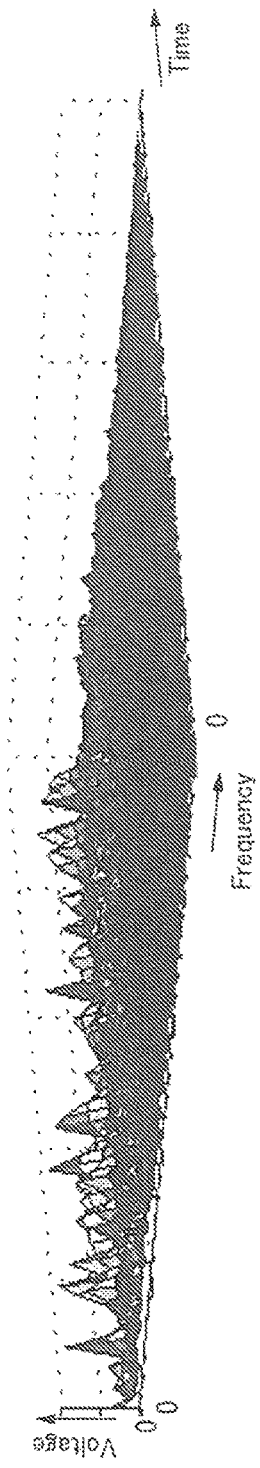

Next, FIG. 24A to FIG. 24C show waveforms relating to a situation where a large volume of water is discharged from the water outlet 23 in the stream mode and the cup is held in almost the same position in the water flow.

FIG. 24A shows a waveform of the sensor signal in the time axis. FIG. 24B shows a result versus the frequency axis, of the frequency analysis process using DCT performed by the frequency analyzer 52c on the sensor signal of FIG. 24A. FIG. 24C shows a result versus the frequency axis and the time axis, of the frequency analysis process using DCT performed by the frequency analyzer 52c on the sensor signal of FIG. 24A.

Figure 25:
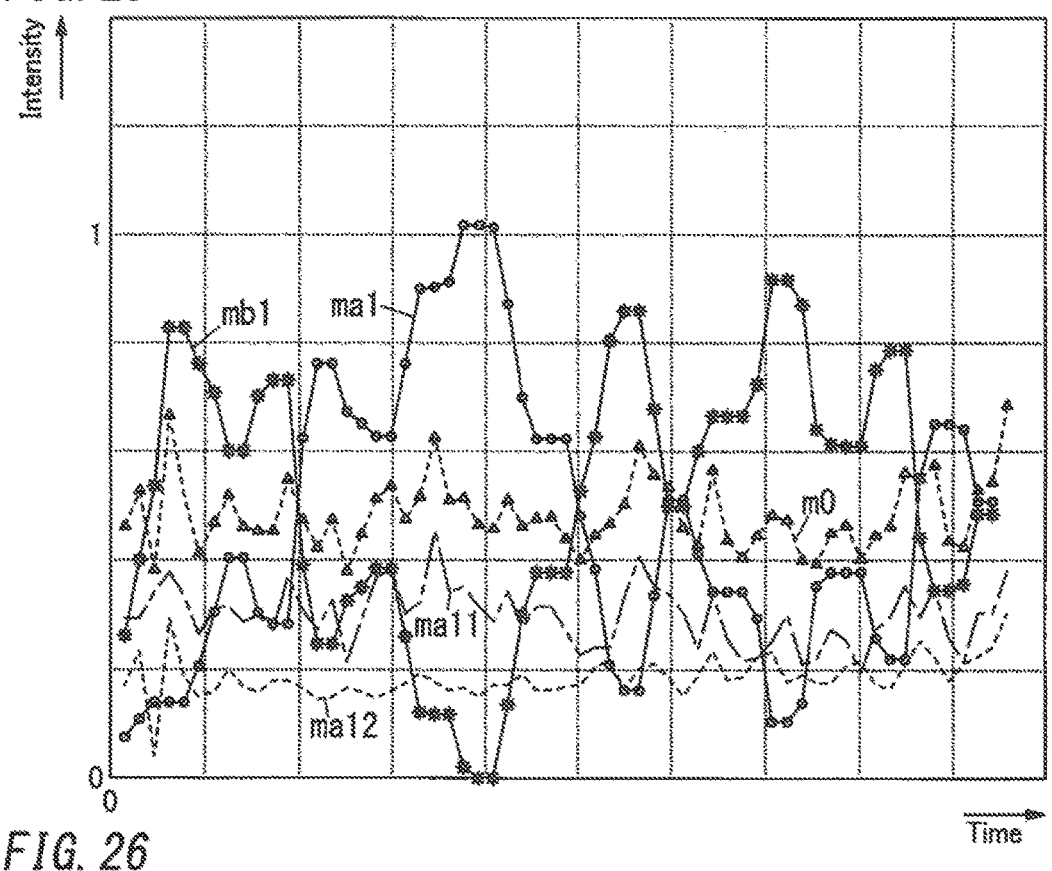
FIG. 25 is a waveform chart resulting from the signal component analysis according to the embodiment.

The recognizer 52e uses the result of the frequency analysis process performed by the frequency analyzer 52c to extract the signal component derived from motions of object to be washed (in this case, the cup) and hands, and the signal component derived from water flow disturbance. FIG. 25 shows a result of the component analysis performed on the sensor signal (the total signal intensity m0 of components of the sensor signal) by the recognizer 52e based on the multiple linear regression analysis. The recognizer 52e calculates the individual signal intensities of the signal component ma1 derived from motions of object to be washed and hands and the signal component mb1 derived from water flow disturbance, and the sum ma11 of lower frequency side normalized intensities of the signal component ma1 and the sum ma12 of higher frequency side normalized intensities of the signal component ma1.

Figure 26:
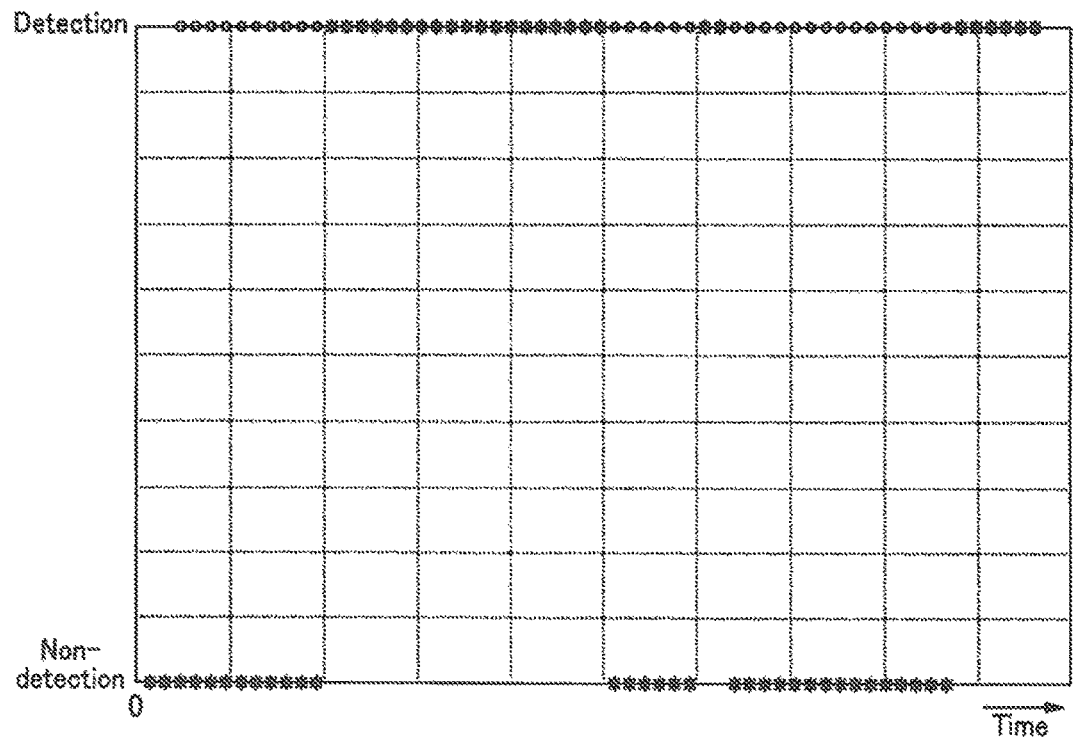
FIG. 26 is an explanatory diagram of the detection result of the detection object according to the embodiment.

FIG. 26 shows a detection result of the detection object 9 from the recognizer 52e. In FIG. 26, "*" represents the detection result relating to motions of the cup and hands in washing (ma1), and "○" represents the detection result relating to the disturbance of the water flow discharged from the water outlet 23 (mb1). In this case, the cup is held in almost the same position. However, the water flow is scattered by the top or the side of the cup, and this may cause water drips. Therefore, it is possible to detect a change in the reflected wave caused by the water drips. The recognizer 52e performs the pattern recognition of the frequency distribution and calculates a logical disjunction of the detection result relating to motion of the cup in washing and the detection result relating to the water flow disturbance in discharging water, and thereby can accurately detect the cup in almost the same position.

As described above, the faucet 1 can realize accurate water discharge control based on the shape of the normalized distribution in the frequency domain of the sensor signal and/or the component analysis of the sensor signal in the frequency domain, for example, without depending on the signal intensity of the sensor signal per se.

Additionally, the signal processor 52 includes a distance meter 52k configured to measure a distance to an object to be washed based on the output of the frequency analyzer 52c. Further, the signal processor 52 includes a direction detector 52l configured to detect a moving direction (approaching or departing) of the object such as an object to be washed, based on the sensor signal.

FIG. 27 shows brief operation of the distance meter 52k.

Initially, the transmission controller 51a of the sensor 51 repeats a sweep process of increasing and then decreasing a frequency fs of a radio wave (transmission signal) sent from the transmitter 51b. The frequency fs of the transmission signal depends on a variation width $\Delta fa$, a center frequency fo1, and a sweep cycle T1 (see FIG. 27A).

Figure 27A:
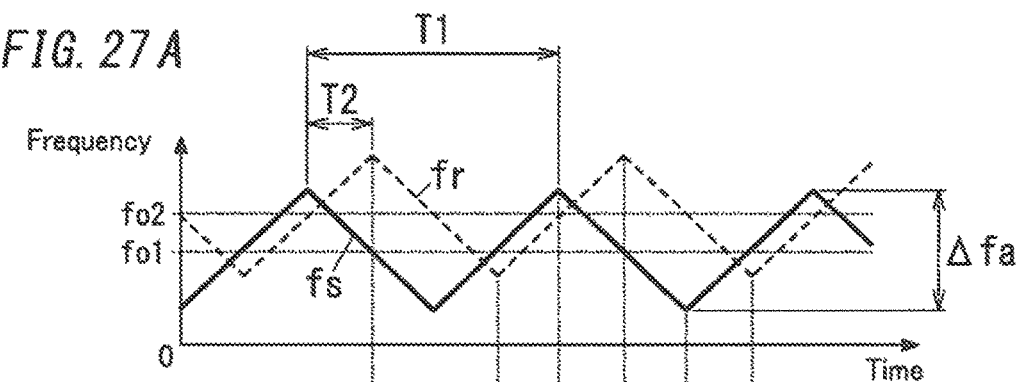
FIG. 27A and FIG. 27B are explanatory diagrams of distance measuring operation according to the embodiment.

The receiver 51e receives a reflected wave (reception signal) after time $T2=2W/C$, where W denotes a distance between the sensor 51 and the object to be washed, and C denotes light speed (see FIG. 27A). The reception signal has a frequency fr which depends on the variation width $\Delta fa$ and the sweep cycle T1 in a similar manner to the frequency fs of the transmission signal. Further, the reception signal has a center frequency $fo2=[fo1+\{(2*fo1*Vr)/C\}]$, where Vr denotes an approaching speed of the object to be washed.

Figure 27B:
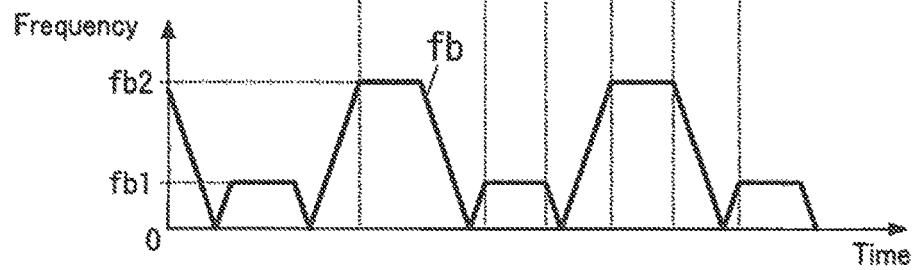

The receiver 51e generates a beat signal with a frequency fb equal to a difference between the frequency fs of the transmission signal and the frequency fr of the reception signal and outputs the beat signal (see FIG. 27B).

When both the frequency fs of the transmission signal and the frequency fr of the reception signal increase, the frequency fb of the beat signal is given by a relation of $fb=fb1=[(4*\Delta fa*W)/(C*T1)]-[(2*fo1*Vr)/C]$. In the above formula, the first term represents positional information indicative of the distance from the detector 5 to the object to be washed, and the second term represents speed information indicative of a speed of the object to be washed approaching the detector 5.

When both frequencies of the transmission signal and the reception signal decrease, the frequency fb of the beat signal is given by a relation of $fb=fb2=[(4*\Delta fa*W)/(C*T1)]+[(2*fo1*Vr)/C]$. In the above formula, the first term represents positional information indicative of the distance from the detector 5 to the object to be washed, and the second term represents speed information indicative of a speed of the object to be washed approaching the detector 5.

The distance meter 52k measures the distance from the sensor 51 to the object to be washed, based on the beat signal subjected to the frequency analyzing process. The recognizer 52e performs the recognition process in combination with distance information (measurement result) generated by the distance meter 52k, and thus can determine a position of the object to be washed. Accordingly, the recognizer 52e can accurately identify and recognize the motion of the object to be washed, and additionally can remove unnecessary signals from an outside of the desired area. In this regard, distance measuring means used by the distance meter 52k is exemplified by an FMCW (Frequency Modulated Continuous Wave) system, but may be another system such as a two frequency system.

Additionally, the direction detector 52l determines the moving direction of the object such as the object to be washed, based on the sensor signal. Moreover, the direction detector 52l determines a moving distance calculated from the moving direction and continuous time of moving. The recognizer 52e performs the recognition process in combination with direction information and the moving distance given by the direction detector 52l, and thus can determine the presence of the object to be washed. Accordingly, the recognizer 52e can accurately identify and recognize the object to be washed. The direction detector 52l can determine the moving direction (direction) of a human body or a part of the human body based on differences between the distance information, for example. The detection method of the moving direction by use of a two channel Doppler sensor is already known, and the detailed description thereof is omitted.

As already known, to expand the distance measuring function, multiple pairs of the reception antenna 51d and the receiver 51e are provided to realize an approaching angle estimation function of the reflected wave. Thereby, it is possible to add a function of determining a position of an object in an actual space in addition to the moving direction.

Figure 28:
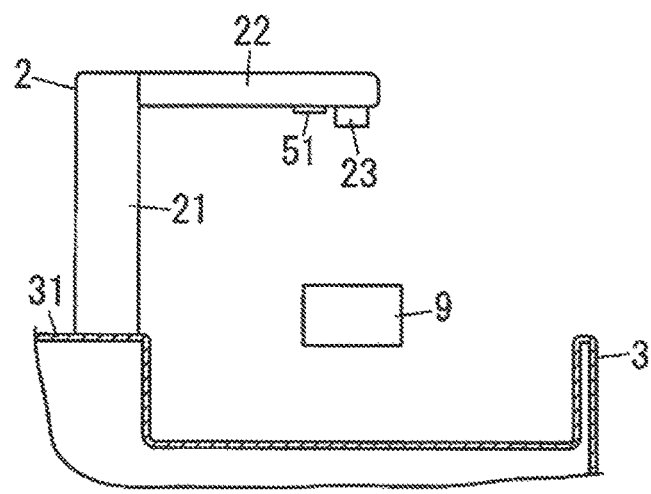
FIG. 28 is a partial side view of an appearance of equipment provided with another faucet according to the embodiment.

Alternatively, the sensor 51 (the transmission antenna 51c and the reception antenna 51d) may be attached to the protrusion 22 of the spout 2, as shown in FIG. 28.

In brief, the faucet 1 includes: the water outlet 23 for discharging water; the detector 5 configured to detect a detection object in the detection area containing the water discharge area in which the water discharged from the water outlet 23 is present; and the controller 4 configured to start and end supply of the water discharged from the water outlet 23 based on the detection result of the detector 5. The detector 5 includes the sensor 51 configured to send a radio wave signal and receive the radio wave signal reflected by an object to output the sensor signal corresponding to motion of the object. The detector 5 further includes the frequency analyzer 52c configured to convert the sensor signal into the frequency domain signal, and extract, by use of the group of individual filter banks 5a with different frequency bands, signals of the individual filter banks 5a from the frequency domain signal. The detector 5 further includes the recognizer 52e configured to perform the recognition process of detecting the detection object 9 based on the detection data containing at least one of the frequency distribution of signals based on the signals of the individual filter banks 5a and the component ratio of signal intensities based on the signals of the individual filter banks 5. The detector 5 further includes the database device 52i configured to store the sample data containing at least one of the frequency distribution corresponding to the detection object 9 and the component ratio of signal intensities corresponding to the detection object 9. The recognizer 52e is configured to perform the recognition process based on comparison between the detection data and the sample data.

Note that, the faucet 1 can offer the same effect even if it is used in a bathroom vanity, a toilet bowl apparatus in a restroom, a shower of a bathroom, or the like.

(SUMMARY)

(1) As described above, the faucet 1 of the present embodiment includes: the water outlet 23, the detector 5, and the controller 4. The water outlet 23 is for discharging water. The detector 5 is configured to detect a detection object 9 in the detection area containing the water discharge area in which the water discharged from the water outlet 23 is present. The controller 4 is configured to start and end supply of the water discharged from the water outlet 23 based on the detection result of the detector 5. The detector 5 includes the sensor 51, the frequency analyzer 52c, the recognizer 52e, and the database device 52i. The sensor 51 is configured to send a radio wave signal and receive the radio wave signal reflected by an object to output the sensor signal corresponding to motion of the object. The frequency analyzer 52c is configured to convert the sensor signal into the frequency domain signal, and extract, by use of the group of individual filter banks 5a with different frequency bands, signals of the individual filter banks 5a from the frequency domain signal. The recognizer 52e is configured to perform the recognition process of detecting the detection object 9 based on the detection data containing at least one of the frequency distribution of signals based on the signals of the individual filter banks 5a and the component ratio of signal intensities based on the signals of the individual filter banks 5. The database device 52i is configured to store the sample data containing at least one of the frequency distribution corresponding to the detection object 9 and the component ratio of signal intensities corresponding to the detection object 9. The recognizer 52e is configured to perform the recognition process based on comparison between the detection data and the sample data.

According to this configuration, the faucet 1 can accurately detect particular motion such as movement of an object to be washed (e.g., dishes and foodstuffs) toward the water outlet 23, motion of the object to be washed, motion of hands for washing, and disturbance of a discharged water flow caused by washing, while suppressing false detection. Further, the detector 5 performs detection by use of radio wave signals, and thus can detect objects even when such objects are black or transparent, and additionally can suppress effects caused by intense light such as sunlight.

In summary, the faucet 1 can suppress unwanted effects such as effects of a surrounding environment, and a color and a material of the detection object 9, to thereby accurately determine whether the detection object 9 is present in a vicinity of a water outlet.

(2) In a preferable configuration of the faucet 1 of the above (1), the detector 5 includes the distance meter 52k configured to measure the distance to the detection object 9 based on the sensor signal. The recognizer 52e is configured to perform the recognition process in combination with the measurement result of the distance meter 52k.

According to this configuration, the recognizer 52e can perform the recognition process in combination with the measurement result generated by the distance meter 52k, and thus can determine a position of the object to be washed. Accordingly, the recognizer 52e can accurately identify and recognize the individual motions of the object to be washed. Additionally, it is possible to remove unnecessary signals from an outside of the desired area.

(3) In a preferable configuration of the faucet 1 of the above (1) or (2), the detector 5 includes the direction detector 52*l* configured to detect the moving direction of the detection object 9, based on the sensor signal. The recognizer 52*e* is configured to perform the recognition process in combination with the detection result of the direction detector 52*l*.

According to this configuration, the recognizer 52*e* can perform the recognition process in combination with the moving direction determined by the direction detector 52*l*, and thus can identify presence of the object to be washed. Accordingly, the recognizer 52*e* can accurately identify and recognize the object to be washed.

(4) In a preferable configuration of the faucet 1 of any one of the above (1) to (3), the recognizer 52*e* is configured to, when the sum of intensities of the signals of the individual filter banks 5*a* is equal to or larger than the threshold value, perform the recognition process. Or, the recognizer 52*e* is configured to, when the sum of intensities of the signals of the individual filter banks 5*a* is equal to or larger than the threshold value, treat the result of the recognition process as being valid. The recognizer 52*e* is configured to change the threshold value or the sample data used in the recognition process, according to the condition of the water discharged from the water outlet 23.

According to this configuration, the faucet 1 can reduce the probability of the false detection or can improve the accuracy of the recognition process performed by the recognizer 52*e*.

(5) In a preferable configuration of the faucet 1 of any one of the above (1) to (4), the detector 5 includes the background signal remover 52*h* configured to remove background signals from signals individually passing through the individual filter banks 5*a*.

According to this configuration, the detector 5 of the faucet 1 can improve the detection accuracy of the detection object 9.

(6) In a preferable configuration of the faucet 1 of any one of the above (1) to (5), the faucet 1 includes the spout 2 inside which the water supply channel connected to the water outlet 23 is formed. The spout 2 includes the base 21 attached to the mounting surface of the outside equipment, and the protrusion 22 protruding from the base 21. The sensor 51 is provided to the base 21 or the protrusion 22.

According to this configuration, the faucet 1 can detect the detection object in the detection area containing the water discharge area of the water outlet 23.

The invention claimed is:
1. A faucet comprising:
a water outlet for discharging water;
a detector that detects a detection target in a detection area containing a water discharge area in which the water discharged from the water outlet is present; and
a controller operably connected to the detector and the water outlet and that starts and ends supply of the water discharged from the water outlet based on a detection result of the detector,
the detector including
a sensor that sends a radio wave signal and receives the radio wave signal reflected by an object to output a sensor signal corresponding to motion of the object,
a frequency analyzer that applies orthogonal transform to the sensor signal to convert the sensor signal into a frequency domain signal, and extracts, by use of a group of individual filter banks with different frequency bands, signals of the individual filter banks from the frequency domain signal,
a recognizer that performs a recognition process of detecting that the object corresponds to the detection target based on detection data containing at least one of a frequency distribution of signals based on the signals of the individual filter banks and a component ratio of signal intensities based on the signals of the individual filter banks, and
a database device that stores sample data containing at least one of a frequency distribution corresponding to the detection target and a component ratio of signal intensities corresponding to the detection target, and the recognizer performs the recognition process based on comparison between the detection data and the sample data.

2. The faucet of claim 1, further comprising a distance meter that measures a distance to the detection target based on the sensor signal,
the recognizer performs the recognition process in combination with a measurement result of the distance meter.

3. The faucet of claim 1, further comprising a direction detector that detects a moving direction of the detection target, based on the sensor signal,
the recognizer performs the recognition process in combination with a detection result of the direction detector.

4. The faucet of claim 1, wherein:
the recognizer, when a sum of intensities of the signals of the individual filter banks is equal to or larger than a threshold value, performs the recognition process or treats a result of the recognition process as being valid; and
the recognizer changes the threshold value or the sample data used in the recognition process, according to a condition of the water discharged from the water outlet.

5. The faucet of claim 1, further comprising a background signal remover that removes background signals from signals individually passing through the individual filter banks.

6. The faucet of claim 1, further comprising a spout inside which a water supply channel connected to the water outlet is formed,
the spout including
a base attached to a mounting surface of outside equipment, and
a protrusion protruding from the base, and
the sensor being provided to the base or the protrusion.

* * * * *